United States Patent
Biornstad et al.

(10) Patent No.: US 7,527,222 B2
(45) Date of Patent: May 5, 2009

(54) COMPOSITE BARREL SECTIONS FOR AIRCRAFT FUSELAGES AND OTHER STRUCTURES, AND METHODS AND SYSTEMS FOR MANUFACTURING SUCH BARREL SECTIONS

(75) Inventors: Robert D. Biornstad, Renton, WA (US); Bruce C. Blankinship, Mt. Vernon, WA (US); Terry J. George, Wichita, KS (US); William H. Ingram, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 476 days.

(21) Appl. No.: 10/851,381

(22) Filed: May 20, 2004

(65) Prior Publication Data
US 2008/0230652 A1 Sep. 25, 2008

Related U.S. Application Data

(60) Provisional application No. 60/559,890, filed on Apr. 6, 2004.

(51) Int. Cl.
*B64C 1/12* (2006.01)
(52) U.S. Cl. .................... 244/120; 244/119
(58) Field of Classification Search .............. 244/119, 244/120, 123.1, 117 R, 131, 123.12, 132; 416/230; 156/93
See application file for complete search history.

(56) References Cited

U.S. PATENT DOCUMENTS

| | | | |
|---|---|---|---|
| 2,004 A | 3/1841 | Harris et al. | |
| 1,976,257 A | * 10/1934 | Harper, Jr. ............. | 244/123.14 |
| 2,992,711 A | 7/1961 | Mitchell et al. | |
| 3,071,217 A | 1/1963 | Lawrence | |

(Continued)

FOREIGN PATENT DOCUMENTS

DE 30 40 838 A 5/1982

(Continued)

OTHER PUBLICATIONS

U.S. Appl. No. 10/819,084, Turnmire et al.

(Continued)

*Primary Examiner*—Tien Dinh
(74) *Attorney, Agent, or Firm*—Perkins Coie LLP

(57) ABSTRACT

Composite sections for aircraft fuselages and methods and systems for manufacturing such sections are disclosed herein. A composite section configured in accordance with one embodiment of the invention includes a skin and at least first and second stiffeners. The skin can include a plurality of unidirectional fibers forming a continuous surface extending 360 degrees about an axis. The first stiffener can include a first flange portion bonded to an interior surface of the skin and a first raised portion projecting inwardly and away from the interior surface of the skin. The second stiffener can include a second flange portion bonded to the interior surface of the skin and a second raised portion projecting inwardly and away from the interior surface of the skin. A method for manufacturing a section of a fuselage in accordance with one embodiment of the invention includes positioning a plurality of uncured stiffeners on a mandrel assembly. The method can further include applying a plurality of fiber tows around the plurality of uncured stiffeners on the mandrel assembly.

36 Claims, 11 Drawing Sheets

U.S. PATENT DOCUMENTS

| | | | |
|---|---|---|---|
| 3,306,767 A | 2/1967 | Boggs | |
| 3,452,501 A | 7/1969 | Sickler et al. | |
| 3,603,096 A | 12/1969 | Wells | |
| 3,490,983 A * | 1/1970 | Lee | 428/113 |
| 3,507,634 A | 4/1970 | O'Driscoll | |
| 3,879,245 A | 4/1975 | Fetherson et al. | |
| 3,976,269 A | 8/1976 | Gupta | |
| 3,995,080 A | 11/1976 | Cogburn et al. | |
| 4,064,534 A | 12/1977 | Chen et al. | |
| 4,086,378 A | 4/1978 | Kam et al. | |
| 4,186,535 A | 2/1980 | Morton | |
| 4,256,790 A | 3/1981 | Lackman et al. | |
| 4,310,132 A | 1/1982 | Frosch | |
| 4,448,838 A * | 5/1984 | McClenahan et al. | 442/229 |
| 4,463,044 A * | 7/1984 | McKinney | 428/107 |
| 4,490,958 A | 1/1985 | Lowe | |
| 4,548,017 A | 10/1985 | Blando | |
| 4,548,859 A | 10/1985 | Kline | |
| 4,608,220 A | 8/1986 | Caldwell | |
| 4,631,221 A | 12/1986 | Disselbeck et al. | |
| 4,693,678 A | 9/1987 | Von Volkli | |
| 4,699,683 A | 10/1987 | McCowin | |
| 4,715,560 A | 12/1987 | Loyek | |
| 4,736,566 A | 4/1988 | Krotsch | |
| 4,760,444 A | 7/1988 | Nielson | |
| 4,780,262 A | 10/1988 | VonVolkli | |
| 4,790,898 A | 12/1988 | Woods | |
| 4,828,202 A | 5/1989 | Jacobs et al. | |
| 4,830,298 A | 5/1989 | Van Blunk | |
| 4,877,471 A | 10/1989 | McCowin | |
| 4,941,182 A | 7/1990 | Patel | |
| 5,024,399 A | 6/1991 | Barquet | |
| 5,058,497 A | 10/1991 | Bishop | |
| 5,086,997 A | 2/1992 | Glass | |
| 5,223,067 A * | 6/1993 | Hamamoto et al. | 156/173 |
| 5,242,523 A * | 9/1993 | Willden et al. | 156/285 |
| 5,251,849 A | 10/1993 | Torres | |
| 5,262,220 A | 11/1993 | Spriggs et al. | |
| 5,297,760 A | 3/1994 | Hart-Smith | |
| 5,337,647 A | 8/1994 | Roberts | |
| 5,399,406 A | 3/1995 | Matsuo et al. | |
| 5,429,326 A | 7/1995 | Garesche | |
| 5,439,549 A | 8/1995 | Fryc | |
| 5,450,147 A | 9/1995 | Dorsey-Palmateer | |
| 5,518,208 A | 5/1996 | Roseburg | |
| 5,540,126 A | 7/1996 | Piramoon | |
| 5,562,788 A | 10/1996 | Kitson et al. | |
| 5,619,837 A | 4/1997 | DiSanto | |
| 5,622,733 A | 4/1997 | Asher | |
| 5,651,600 A | 7/1997 | Dorsey-Palmateer | |
| 5,683,646 A | 11/1997 | Reiling | |
| 5,700,337 A | 12/1997 | Jacobs | |
| 5,746,553 A | 5/1998 | Engwall | |
| 5,765,329 A | 6/1998 | Huang et al. | |
| 5,804,276 A | 9/1998 | Jacobs | |
| 5,814,386 A | 9/1998 | Vasiliev | |
| 5,871,117 A | 2/1999 | Protasov | |
| 5,893,534 A | 4/1999 | Watanabe | |
| 5,951,800 A | 9/1999 | Pettit | |
| 5,954,917 A | 9/1999 | Jackson et al. | |
| 5,963,660 A | 10/1999 | Koontz | |
| 5,979,531 A | 11/1999 | Barr | |
| 6,003,812 A | 12/1999 | Micale et al. | |
| 6,012,883 A | 1/2000 | Engwall | |
| 6,013,341 A | 1/2000 | Medvedev | |
| 6,045,651 A | 4/2000 | Kline | |
| 6,070,831 A | 6/2000 | Vassiliev et al. | |
| 6,074,716 A | 6/2000 | Tsotsis | |
| 6,086,696 A | 7/2000 | Gallagher | |
| 6,112,792 A | 9/2000 | Barr | |
| 6,114,012 A | 9/2000 | Amaoka et al. | |
| 6,114,050 A * | 9/2000 | Westre et al. | 428/608 |
| 6,155,450 A | 12/2000 | Vasiliev et al. | |
| 6,168,358 B1 | 1/2001 | Engwall | |
| 6,187,411 B1 | 2/2001 | Palmer | |
| 6,190,484 B1 * | 2/2001 | Appa | 156/189 |
| 6,205,239 B1 | 3/2001 | Lin | |
| 6,364,250 B1 | 4/2002 | Brinck | |
| 6,374,750 B1 | 4/2002 | Early | |
| 6,390,169 B1 | 5/2002 | Johnson | |
| 6,415,581 B1 | 7/2002 | Shipman et al. | |
| 6,451,152 B1 | 9/2002 | Holmes | |
| 6,480,271 B1 | 11/2002 | Cloud | |
| 6,508,909 B1 | 1/2003 | Cerezo Pancorbo et al. | |
| 6,510,961 B1 * | 1/2003 | Head et al. | 220/645 |
| 6,613,258 B1 | 9/2003 | Maison et al. | |
| 6,648,273 B2 | 11/2003 | Anast | |
| 6,692,681 B1 | 2/2004 | Lunde | |
| 6,702,911 B2 * | 3/2004 | Toi et al. | 156/93 |
| 6,730,184 B2 | 5/2004 | Kondo et al. | |
| 6,766,984 B1 | 7/2004 | Ochoa | |
| 6,779,707 B2 | 8/2004 | Dracup et al. | |
| 6,786,452 B2 | 9/2004 | Yamashita et al. | |
| 6,799,619 B2 | 10/2004 | Holmes | |
| 6,802,931 B2 | 10/2004 | Fujihira et al. | |
| 6,817,574 B2 | 11/2004 | Solanille et al. | |
| 6,860,957 B2 | 3/2005 | Sana et al. | |
| 6,871,684 B2 | 3/2005 | Engelbart et al. | |
| 6,910,043 B2 | 6/2005 | Iivonen et al. | |
| 7,025,305 B2 | 4/2006 | Folkesson et al. | |
| 7,039,485 B2 | 5/2006 | Engelbart et al. | |
| 7,039,797 B2 | 5/2006 | Huang et al. | |
| 7,048,024 B2 | 5/2006 | Clark et al. | |
| 7,074,474 B2 | 7/2006 | Toi et al. | |
| 7,080,805 B2 | 7/2006 | Prichard et al. | |
| 7,282,107 B2 | 10/2007 | Johnson et al. | |
| 2001/0042186 A1 | 11/2001 | Iivonen et al. | |
| 2002/0009935 A1 * | 1/2002 | Hsiao et al. | 442/149 |
| 2002/0141632 A1 | 10/2002 | Engelbart | |
| 2003/0145932 A1 | 8/2003 | Holmes et al. | |
| 2004/0021038 A1 | 2/2004 | Solanille et al. | |
| 2004/0031567 A1 | 2/2004 | Engelbart et al. | |
| 2004/0035979 A1 | 2/2004 | McCoskey et al. | |
| 2004/0155148 A1 | 8/2004 | Folkesson et al. | |
| 2005/0211840 A1 | 9/2005 | Grether et al. | |
| 2005/0224648 A1 | 10/2005 | Grether et al. | |
| 2005/0247396 A1 | 11/2005 | Oldani et al. | |
| 2006/0060705 A1 | 3/2006 | Stulc et al. | |
| 2006/0108058 A1 | 5/2006 | Chapman et al. | |
| 2006/0118235 A1 | 6/2006 | Lum et al. | |
| 2006/0118244 A1 | 6/2006 | Zaballos et al. | |
| 2006/0180704 A1 | 8/2006 | Olson et al. | |
| 2006/0188342 A1 | 8/2006 | Salama et al. | |

FOREIGN PATENT DOCUMENTS

| | | |
|---|---|---|
| DE | 33 31 494 A | 3/1985 |
| EP | 0198744 A1 | 10/1986 |
| EP | 0 319 797 | 6/1989 |
| EP | 0 833 146 | 9/1997 |
| EP | 1 149 687 | 10/2001 |
| WO | WO-03035380 | 5/2003 |

OTHER PUBLICATIONS

U.S. Appl. No. 10/853,075, Johnson et al.
U.S. Appl. No. 60/559,890, Bjornstad et al.
U.S. Appl. No. 60/559,911, Johnson et al.
International Search Report and Written Opinion for PCT/US2004/039905; Applicant: The Boeing Company; May 25, 2005; 10 pgs.
Prof. J. Zhang: "Angewandte Sensorik" Ch. 4. Sensoren in Der Robotik, Nov. 11, 2003, pp. 76-113; XP002327793; URL:http://tech-www.informatik.uni-hamburg.de/lehre/ws2003/voriesungen/angewandte_sensorik/vorlesung_03.pdf, accessed Apr. 2004.
U.S. Appl. No. 10/846,974, Engelbart et al.

European Search Report for Application No. EP 03 07 8499, Mar. 4, 2004, European Patent Office.

Grimshaw, Michael N. et al. "Advanced Technology Tape Laying for Affordable Manufacturing of Large Composite Structures," (11pgs); http://www.cinmach.com/tech/pdf/TapeLayingGrimshaw.pdf.

Grimshaw, Michael N., "Automated Tape Laying," (6 pgs); http://www.cinmach.com/tech/pdf/Grimshaw%20ASM%20Handbook.pdf.

Raytheon Aircraft's Hawker Horizon Reaches Fuselage Milestone, Reytheon News Release; http://www.beechcraft.de/Presse/2000/100900b.htm; [accessed Jun. 26, 2004].

PCT International Search Report and Written Opinion for PCT/US2005/010341; Applicant: The Boeing Company, dated Apr. 4, 2006, 18 pgs.

CNC Fiber Placement used to create an all-composite fuselage; http://www.sae.org/aeromag/techninnovations/129t08.htm; Oct. 5, 2000; 2 pgs.

U.S. Appl. No. 09/819,022, Engelbart et al.
U.S. Appl. No. 10/068,735, Englebart et al.
U.S. Appl. No. 10/217,805, Engelbart et al.
U.S. Appl. No. 10/301,949, Nelson.
U.S. Appl. No. 10/628,691, Engelbart et al.
U.S. Appl. No. 10/630,594, Braun.
U.S. Appl. No. 10/646,316, Engelbart et al.
U.S. Appl. No. 10/646,392, Engwall et al.
U.S. Appl. No. 10/646,509, Johnson et al.
U.S. Appl. No. 10/664,148, Engelbart et al.
U.S. Appl. No. 10/717,030, Johnson et al.
U.S. Appl. No. 10/726,099, Engelbart et al.
U.S. Appl. No. 10/799,306, Engelbart et al.

http://www.cinmach.com/sompnews/PressReleases/pro00-11.html; Raytheon Aircraft Orders Four More Fiber Cincinnati Fiber Placement Systems for Industry's First Composite-Fuselage Business Jets, 2 pgs.

Fiedler, L. et al. "Tango Composite Fuselage Platform", SAMPE Journal, vol. 39, No. 1, Jan. 2003.

Systems and Methods for Using Light to Indicate Defect Locations on a Composite Structure, (51 pgs).

Rocky Mountain Composites, Filament Winding, http://wwwrockymountaincomposites.com/wind_sys.html; Filament Winding, 2 pgs [accessed Feb. 28, 2004].

http://www.cinmach.com/WolfTracks4_1/MTG_WT7.Html; Premier 1 Features Lighter, Stronger All Composite Fuselage, 3 pgs.

Sharp et al; "Material Selection/Fabrication Issues for Thermoplastic Fiber Placement", Journal of Thermosplastic Composite Materials, vol. 8; Jan. 1995, pp. 2-14.

BAe 146, Flight International, May 2, 1981.

CASA, SAMPE Journal, vol. 39, No. 1, Jan./Feb. 2003, p. 60.

The Barrelful of Experience, Intervia, May 1992, 2 pgs.

Premiue I Feature Lighter, Stronger All-Composite Fuselage, WolfTracks, vol. 4, No. 1, http://www.cinmach.com/wolfTracks4_1/MTG_WT7.htm [accessed Mar. 25, 2004].

Raytheon Aircraft Orders Four More Fiber Cincinnati Fiber Placement System for Industry's First Composite-Fuselage Business Jets, http://www.cinmach.com/compnews/PressReleases/pr00-11.htm [accessed Mar. 25, 2004].

Raytheon, Mar. 2000, vol. 4, No. 2, http://www.cts.com/king/vasci/newsletter/vol42.html [accessed Mar. 1, 2004 ].

Beechcraft's Composite Challange, http://www.aerotalk.com/Beech.cfm [accessed Mar. 1, 2004].

Evans, Don O., "Fiber Placement", 3 pgs, Cincinnati Machine, no date available.

* cited by examiner

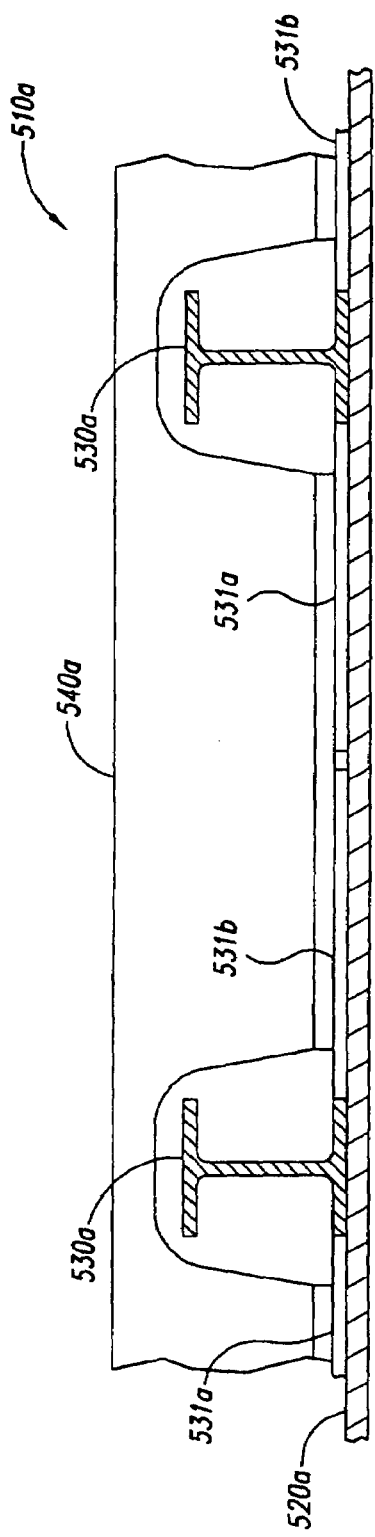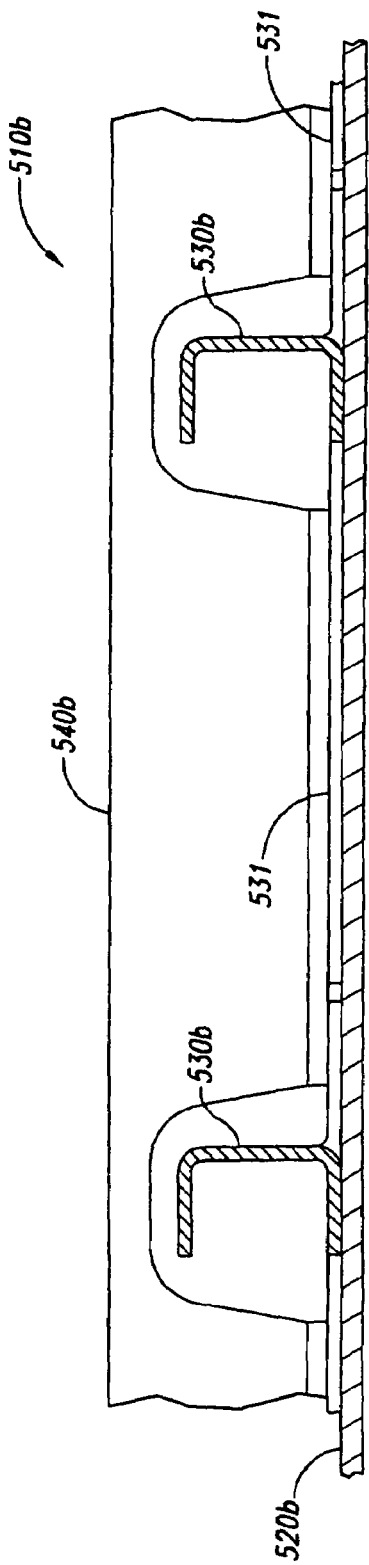
Fig. 5A
Fig. 5B

COMPOSITE BARREL SECTIONS FOR AIRCRAFT FUSELAGES AND OTHER STRUCTURES, AND METHODS AND SYSTEMS FOR MANUFACTURING SUCH BARREL SECTIONS

CROSS-REFERENCE TO RELATED APPLICATION

The present application claims priority to copending U.S. Provisional Patent Application No. 60/559,890, entitled "COMPOSITE BARREL SECTIONS FOR AIRCRAFT FUSELAGES AND OTHER STRUCTURES, AND METHODS AND SYSTEMS FOR MANUFACTURING SUCH BARREL SECTIONS," filed Apr. 6, 2004, and incorporated herein in its entirety by reference.

TECHNICAL FIELD

The following disclosure relates generally to aircraft structures and, more particularly, to composite barrel sections for aircraft fuselages and methods and systems for manufacturing such barrel sections.

BACKGROUND

Aircraft manufacturers continually strive for ways to increase aircraft performance and reduce manufacturing costs. One well-known method for increasing aircraft performance is to reduce airframe weight through the use of composite materials having relatively high strength-to-weight ratios. Composite materials have been used on airframes for fighter aircraft, high-performance private aircraft, and business jets. Larger aircraft, however, such as large commercial transport aircraft, typically use metallic materials for all or most of the primary structure. The fuselage shells for commercial transport aircraft, for example, are typically manufactured from aluminum and other metals.

Conventional methods for manufacturing business jet airframes with composite materials typically require extensive tooling fixtures and labor-intensive assembly procedures. One known method used by the Raytheon Aircraft Company of Wichita, Kans., to manufacture the Premier I and Hawker Horizon business jets involves wrapping carbon fibers around a rotating mandrel with an automated fiber placement system. The mandrel provides the basic shape of a fuselage section. The carbon fibers are preimpregnated with a thermoset epoxy resin, and they are applied over the rotating mandrel in multiple plies to form an interior skin of the fuselage section. The interior skin is then covered with a layer of honeycomb core. The fiber placement system then applies additional plies of preimpregnated carbon fibers over the honeycomb core to form an exterior skin that results in a sandwich structure. The final ply includes a hybrid fabric of carbon fiber and fine metallic wires to provide lightning strike protection.

The Premier I fuselage includes two composite fuselage sections formed in the foregoing manner. The Hawker Horizon fuselage includes three sections formed in this manner. After forming, the respective fuselage sections are bonded together along circumferential joints to form the complete fuselage shell. Another method for forming composite fuselage shells in accordance with the prior art involves forming fuselage halves or quarter-panels separately (for example, by a fabric lay-up process), and then joining the separate parts together along longitudinal joints to form a complete fuselage cross-section.

Filament winding, fiber placement, and tape laying are three known methods for applying unidirectional composite fibers to a rotating mandrel to form a continuous cylindrical skin. In a filament winding process, the mandrel is typically suspended horizontally between end supports. The mandrel rotates about the horizontal axis as a fiber application instrument moves back and forth along the length of the mandrel, placing fiber onto the mandrel in a predetermined configuration. In most applications, the filament winding apparatus passes the fiber material through a resin "bath" just before the material touches the mandrel. This is called "wet winding." In other applications, the fiber has been preimpregnated with resin, eliminating the need for the resin bath. Following oven or autoclave curing of the resin, the mandrel can remain in place and become part of the wound component, or it can be removed.

The fiber placement process typically involves the automated placement of multiple "tows" (i.e., untwisted bundles of continuous filaments, such as carbon or graphite fibers, preimpregnated with a thermoset resin material such as epoxy) tape, or slit tape onto a rotating mandrel at high speed. A typical tow is between about 0.12" and 0.25" wide when flattened. Conventional fiber placement machines dispense multiple tows to a movable payoff head that collimates the tows (i.e., renders the tows parallel) and applies the tows to the rotating mandrel surface using one or more compaction rollers that compress the tows against the surface. In addition, such machines typically include means for dispensing, clamping, cutting and restarting individual tows during placement.

Tape laying is similar to the fiber placement process described above except that preimpregnated fiber tape, rather than individual tows, is laid down on the rotating mandrel to form the part. One form of tape includes a paper backing that maintains the width and orientation of the fibers. The paper backing is removed during application. Slit tape is tape that has been slit after being produced in standard widths by the manufacturer. Slitting the tape results in narrower widths that allow enhanced stearability and tailoring during application to achieve producibility and design objectives. Slit tape can have widths varying from about 0.12 inch up to about 6 inches, and may or may not include backing paper. Another form of tape includes multiple individual fibers woven together with a cloth material. As used throughout this disclosure, unless otherwise indicated, the term "tape" refers to tape, tape with backing paper, slit tape, and other types of composite material in tape form for use in manufacturing composite structures. Tape laying is often used for parts with highly complex contours or angles because the tape allows relatively easy directional changes.

SUMMARY

The present invention is directed generally toward composite sections for aircraft fuselages and other structures. A section configured in accordance with one aspect of the invention includes a skin having a plurality of fiber tows forming a continuous surface extending 360 degrees about an axis. The section can further include at least first and second stiffeners. The first stiffener can have a first flange portion bonded to an interior surface of the skin and a first raised portion projecting inwardly and away from the interior surface of the skin. The second stiffener can have a second flange portion bonded to the interior surface of the skin and a second raised portion projecting inwardly and away from the interior surface of the skin. A section configured in accordance with another aspect of the invention can include a skin having a plurality of fiber tapes forming the continuous surface instead of or in addition to the plurality of collimated fiber tows.

A method for manufacturing a section of a fuselage in accordance with one aspect of the invention includes positioning a plurality of stiffeners on a mandrel assembly and rotating the mandrel assembly about a longitudinal axis. The method can further include applying a plurality of fiber tows to form a continuous skin extending 360 degrees around the mandrel assembly. After application of the fiber tows, the stiffeners and the fiber tows can be cocured. A method for manufacturing a section of a fuselage in accordance with another aspect of the invention can include laying fiber tape over the stiffeners on the rotating mandrel assembly instead of or in addition to the fiber tows.

BRIEF DESCRIPTION OF THE DRAWINGS

FIGS. 5A and 5B are cross-sectional end views of portions of fuselage barrel sections configured in accordance with yet other embodiments of the invention.

DETAILED DESCRIPTION

The following disclosure describes composite barrel sections for aircraft fuselages and other structures, and methods and systems for manufacturing such barrel sections. Throughout this disclosure, the term barrel section is used for convenience to refer generally to an enclosed shell structure extending 360 degrees about an axis. Such structures can include, for example, cylindrical shells having circular, oval, elliptical, egg-shaped, and other symmetrical and/or asymmetrical cross-sectional shapes. Such structures can further include enclosed, non-cylindrical shells. Certain details are set forth in the following description and in FIGS. 1-14C to provide a thorough understanding of various embodiments of the invention. Other details describing well-known structures and systems often associated with aircraft structures and composite fabrication techniques are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
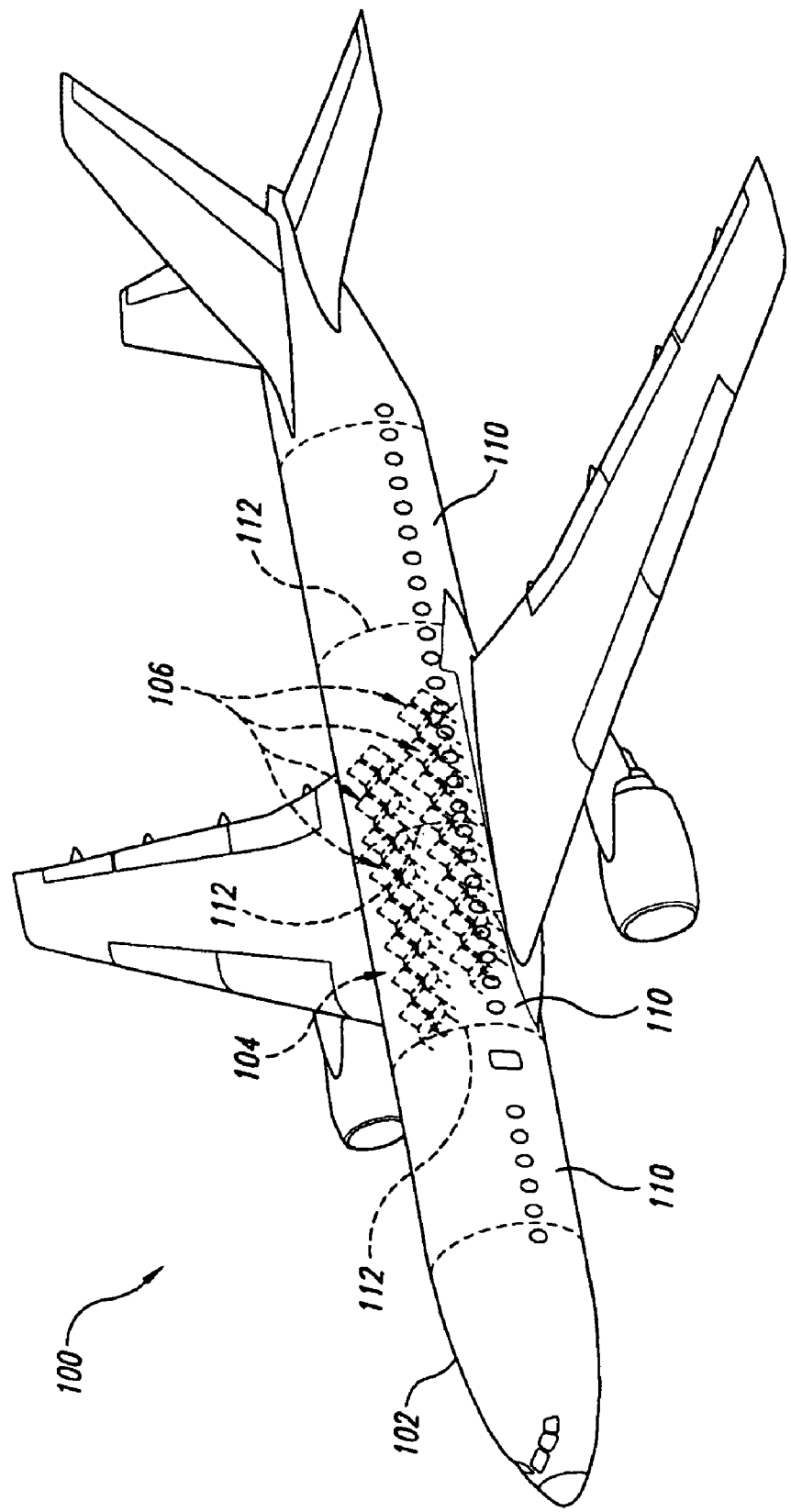
FIG. 1 is a partially hidden isometric view of an aircraft having a fuselage that includes a plurality of barrel sections configured in accordance with an embodiment of the invention.

FIG. 1 is a partially hidden isometric view of an aircraft 100 having a fuselage 102 that includes a plurality of barrel sections 110 configured in accordance with an embodiment of the invention. In one aspect of this embodiment described in greater detail below, each of the barrel sections 110 can be individually fabricated as a one-piece section from composite materials, such as carbon fiber and/or graphite-epoxy materials. After fabrication, the barrel sections 110 can be joined together by adhesive bonding and/or mechanical fastening along circumferential joints 112 to form the fuselage 102.

In another aspect of this embodiment, the fuselage 102 can include a passenger cabin 104 configured to hold a plurality of passenger seats 106. In the illustrated embodiment, the passenger cabin 104 is configured to hold at least about 50 of the passenger seats 106, e.g., from about 50 to about 700 passenger seats. In another embodiment, the passenger cabin 104 can be configured to hold from about 150 to about 400 of the passenger seats 106. In other embodiments, the passenger cabin 104 can be configured to hold more or fewer seats or, alternatively, the passenger seats 106 can be omitted and the cabin space can be used for other purposes, such as hauling cargo.

Figure 2A:
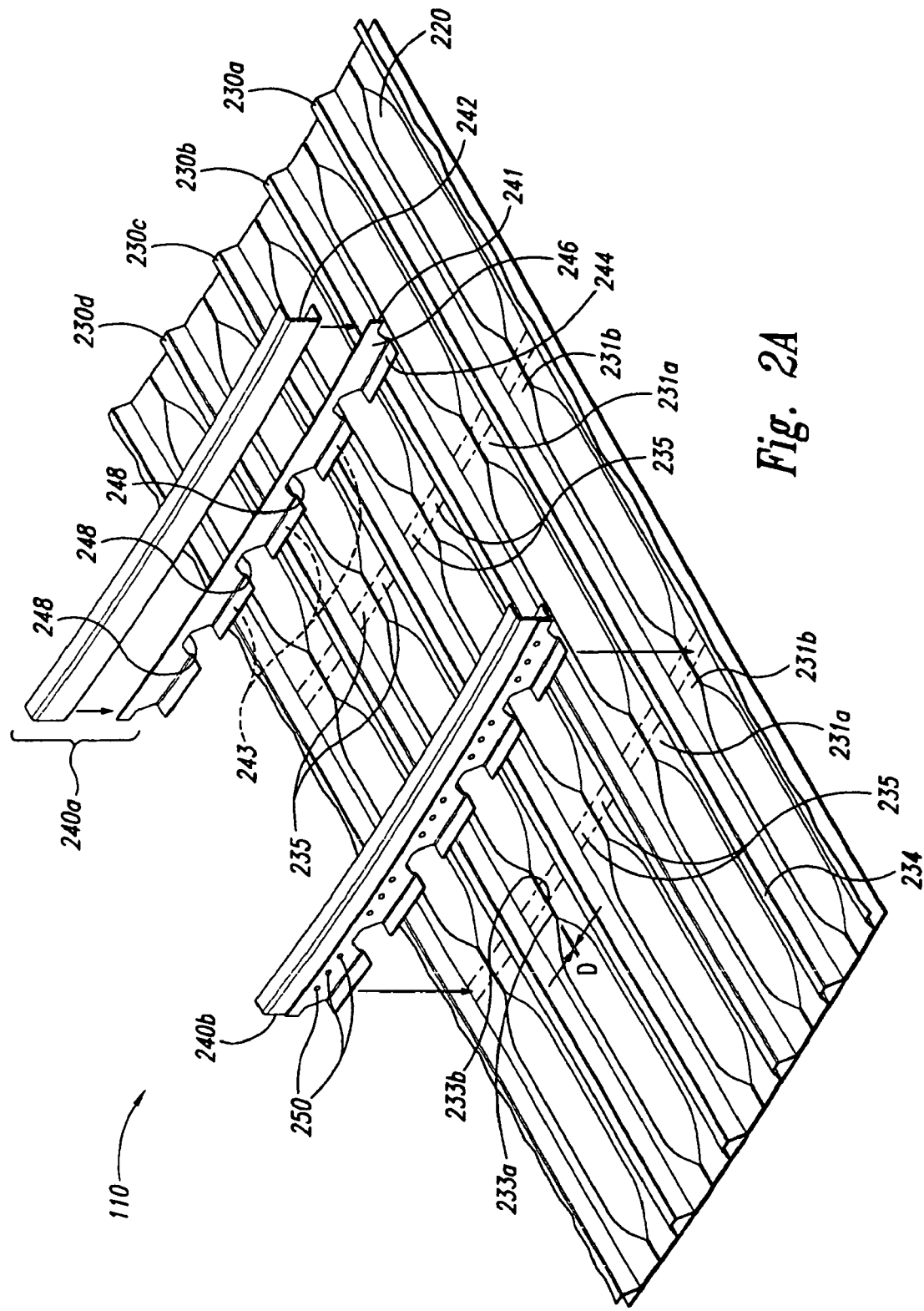
FIGS. 2A and 2B are an exploded isometric view and an assembled isometric view, respectively, of a portion of a fuselage barrel section configured in accordance with an embodiment of the invention.
Figure 2B:
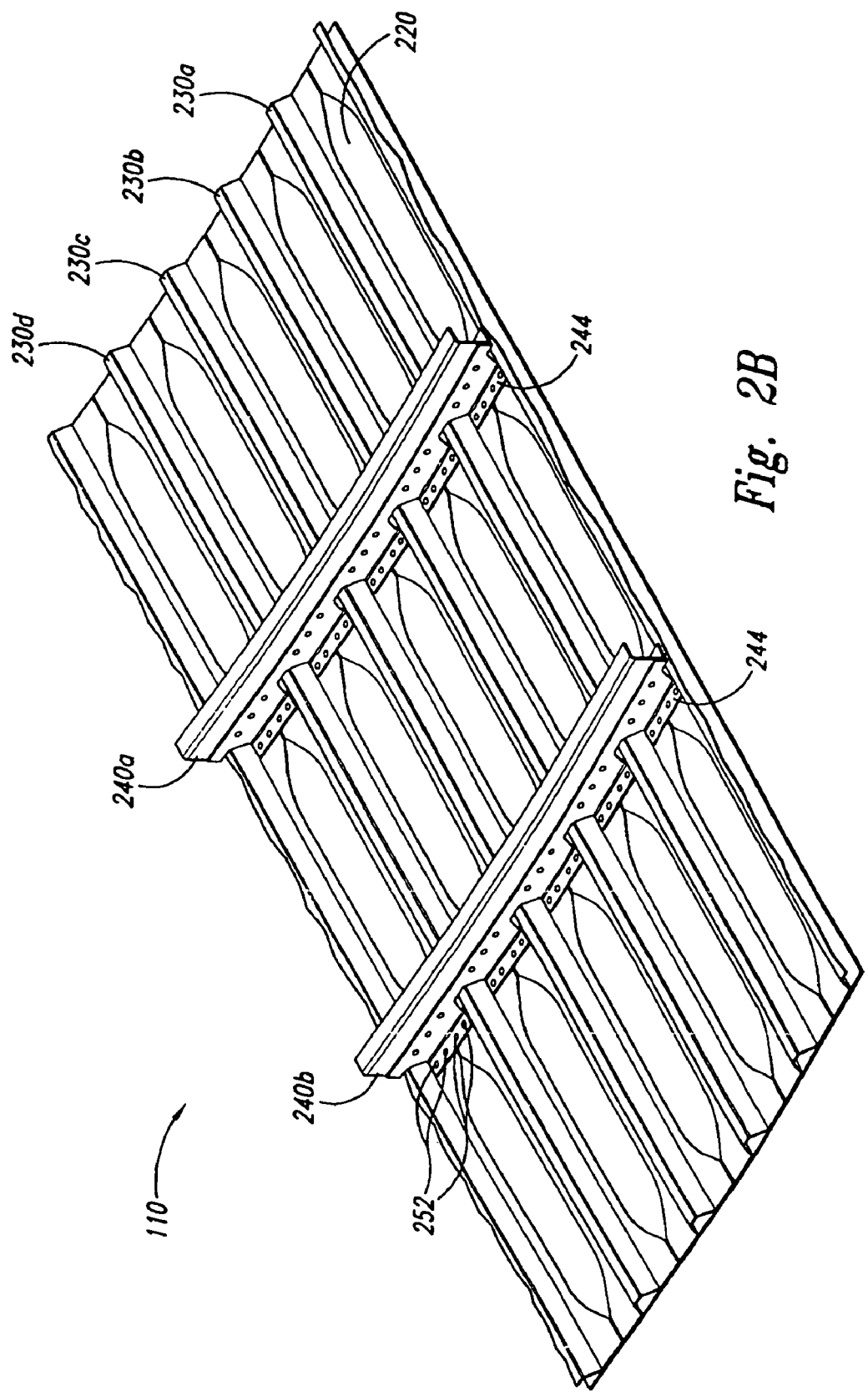

FIG. 2A is an enlarged, partially exploded, interior isometric view of a portion of one of the barrel sections 110 of FIG. 1, configured in accordance with an embodiment of the invention. FIG. 2B is an assembled isometric view of the barrel section portion of FIG. 2A. Referring to FIGS. 2A and 2B together, the barrel section 110 can include a plurality of stiffeners 230 (identified individually as stiffeners 230a-d) attached to a skin 220. Each of the stiffeners 230 can include a raised portion 234 projecting away from the skin 220 and a plurality of flange portions 231 (identified as a plurality of first flange portions 231a extending outwardly from one side of the stiffener 230, and a plurality of second flange portions 231b extending outwardly from an opposite side of the stiffener 230). The flange portions 231 can be mated directly to the skin 220. In the illustrated embodiment, the stiffeners 230 have hat-shaped cross-sections. In other embodiments described below, however, the stiffeners 230 can have other cross-sectional shapes.

In one embodiment described in greater detail below, the skin 220 and the stiffeners 230 can include composite materials, such as carbon fiber materials. In this embodiment, the stiffeners 230 can be bonded to the skin 220. For example, in one embodiment described in detail below, the stiffeners 230 can be bonded to the skin 220 during a cocuring process in which the stiffeners 230 and the skin 220 are cocured at an elevated temperature and pressure. In another embodiment, the stiffeners 230 can be pre-cured and adhesively bonded to the skin 220 when exposed to an elevated temperature and pressure. In yet other embodiments, the stiffeners 230 can be mechanically fastened to the skin 220.

Each of the stiffeners 230 can be positioned on the skin 220 so that the plurality of first flange portions 231a of one stiffener 230 are aligned with the corresponding plurality of second flange portions 231b of an adjacent stiffener 230. For example, each of the first flange portions 231a can include a first outer edge 233a, and each of the second flange portions 231b can include a corresponding second outer edge 233b. In one embodiment, the first outer edge 233a can be spaced apart from the second outer edge 233b by a distance D of about 0.5 inch or less. In another embodiment, the distance D can be about 0.2 inch or less, e.g., about 0.1 inch. In yet another embodiment, the stiffeners 230 can be positioned on the skin 220 such that the first flange portions 231a at least approximately contact the second flange portions 231b. In this case, the distance D is at least approximately zero. When the flange portions 231 are aligned in the foregoing manner, the flange portions 231 can form a plurality of at least approximately continuous support surfaces 235 extending between the raised portions 234 of the stiffeners 230.

The barrel section 110 can further include a plurality of support members or frames 240 (identified individually as a first frame 240a and a second frame 240b). In the illustrated embodiment, the frames 240 are two-piece frames that include a first frame section 241 and a second frame section 242. In this embodiment, the second frame section 242 has a C-shaped cross-section. In other embodiments, the second frame section 242 can have other cross-sectional shapes, such as an L-shaped cross-section. In yet other embodiments, the frames 240 can be omitted or, alternatively, the barrel section 110 can include other frames composed of more or fewer frame sections.

The first frame section 241 includes a base portion 244 and an upstanding portion 246 projecting away from the base portion 244. The upstanding portion 246 can include a plurality of openings, e.g., "mouse holes" 248 through which the raised portions 234 of the stiffeners 230 extend. The base portion 244 can include a plurality of mating surfaces 243 extending between the mouse holes 248. The mating surfaces 243 are configured to contact corresponding ones of the support surfaces 235 extending between the raised portions 234 of the stiffeners 230. The mating surfaces 243 of the illustrated embodiment are absent any joggles between the mouse holes 248 because the corresponding support surfaces 235 to which they mate are at least approximately continuous between the stiffeners 230 and do not include any significant surface steps or misalignments. An advantage of this feature is that it avoids the added costs associated with manufacturing frames with joggles. Such costs may be particularly significant when working with composite materials because, unlike creating joggles or steps in metals, which are malleable and can be easily formed, creating joggles or steps in composite surfaces typically requires special tooling and/or post-cure machining.

In one embodiment of the invention, the first frame section 241 can be attached to the barrel section 110 first, and then the second frame section 242 can be attached to the first frame section 241. When attaching the first frame section 241 to the barrel section 110, the base portion 244 of the first frame section 241 is mated to the flange portions 231 of the stiffeners 230 without being mated to the skin 220. That is, the mating surfaces 243 of the base portion 244 contact the support surfaces 235 but not the skin 220. In this manner, the flange portions 231 are effectively sandwiched between the first frame section 241 and the skin 220. In one embodiment, the first frame section 241 can be fastened to the barrel section 110 with a series of suitable fasteners 252, as shown in FIG. 2B. In another embodiment, the base portion 244 can be adhesively bonded directly to the flange portions 231.

After the first frame section 241 has been attached to the barrel section 110, the second frame section 242 can be attached to the first frame section 241. In one embodiment, the second frame section 242 can be fastened to the upstanding portion 246 of the first frame section 241 with a series of suitable fasteners 250, as shown in FIG. 2A. In another embodiment, the second frame section 242 can be adhesively bonded to the upstanding portion 246. One advantage of attaching the second frame section 242 to the first frame section 241 after the first frame section 241 has been installed is that the final position of the second frame section 242 can be adjusted to compensate for any misalignment of the first frame section 241 that may have occurred during installation of the first frame section 242. In other embodiments, however, the first frame section 241 can be attached to the second frame section 242 first, and then the frame 240 can be attached to the barrel section 110 as a complete unit.

In another embodiment of the invention, the flange portions 231 of the stiffeners 230 can be at least partially omitted. In this embodiment, a raised portion can be formed on the skin 220 between the stiffeners 230 with an additional ply or plies of material. The raised portion can take the place of the flange portions 231 in forming the support surface 235 to which the base portion 244 of the first frame section 241 mates.

Figure 3A:
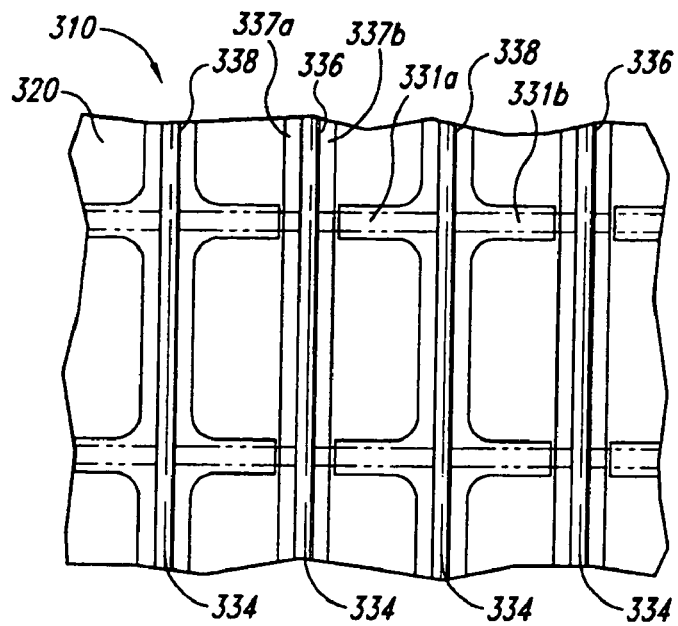
FIGS. 3A and 3B are top and end views, respectively, of a portion of a fuselage barrel section configured in accordance with another embodiment of the invention.
Figure 3B:
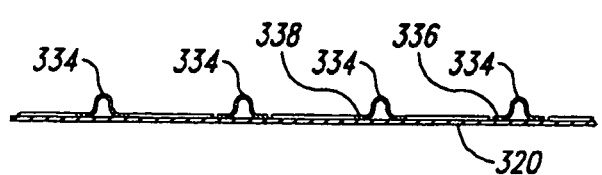

FIGS. 3A and 3B are top and end views, respectively, of a portion of a barrel section 310 configured in accordance with another embodiment of the invention. Referring to FIGS. 3A and 3B together, the barrel section 310 can include a plurality of first stiffeners 336 and a plurality of second stiffeners 338 attached to a skin 320. Each of the stiffeners 336 and 338 can include a raised portion 334 projecting away from the skin 320. Each of the first stiffeners 336 can further include a first flange portion 337a and an opposing second flange portion 337b that are at least generally straight. Each of the second stiffeners 338, however, can further include a plurality of first flange portions 331a and a plurality of opposing second flange portions 331b that extend outwardly from the raised portion 334 to at least proximate corresponding flange portions 337 of the adjacent first stiffeners 336. A frame (not shown) can mate to the flange portions 331 and 337 as described above with reference to FIGS. 2A and 2B.

Figure 4A:
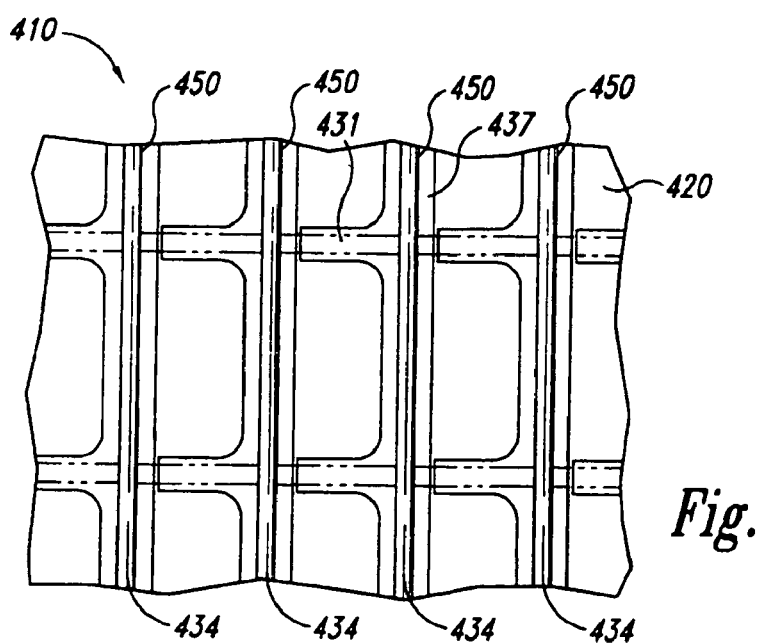
FIGS. 4A and 4B are top and end views, respectively, of a portion of a fuselage barrel section configured in accordance with a further embodiment of the invention.
Figure 4B:
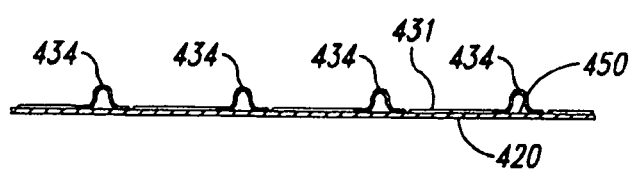

FIGS. 4A and 4B are top and end views, respectively, of a portion of a barrel section 410 configured in accordance with a further embodiment of the invention. Referring to FIGS. 4A and 4B together, the barrel section 410 can include a plurality of asymmetric stiffeners 450 attached to a skin 420. Each of the asymmetric stiffeners 450 can include a plurality of first flange portions 431 extending outwardly from one side of a raised portion 434, and a second flange portion 437 extending outwardly from an opposite side of the raised portion 434. The second flange portion 437 can be at least approximately straight. The first flange portions 431, however, can project outwardly from the raised portion 434 to at least proximate the corresponding second flange portion 437 of the adjacent stiffener 450. A frame (not shown) can mate to the flange portions 431 and 437 as described above with reference to FIGS. 2A and 2B.

FIGS. 5A and 5B are cross-sectional end views of portions of barrel sections 510a and 510b, respectively, configured in accordance with other embodiments of the invention. Referring first to FIG. 5A, in one aspect of this embodiment, the barrel section 510a includes a plurality of I-section stiffeners 530a attached to a skin 520a. Each of the I-section stiffeners 530a can include a plurality of first flange portions 531a and a plurality of second flange portions 531b that are at least generally similar in structure and function to the corresponding flange portions 231 described above with reference to FIGS. 2A and 2B. In another aspect of this embodiment, a frame 540a can mate to the flange portions 531 as described above with reference to FIGS. 2A and 2B.

Referring next to FIG. 5B, in one aspect of this embodiment, the barrel section 510b includes a plurality of C-section stiffeners 530b attached to a skin 520b. The C-section stiffeners 530b can include flange portions 531 that are at least generally similar in structure and function to the first flange portions 431 described above with reference to FIGS. 4A and 4B. In another aspect of this embodiment, a frame 540b can mate to the flange portions 531 as described above with reference to FIGS. 2A and 2B.

Figure 6:
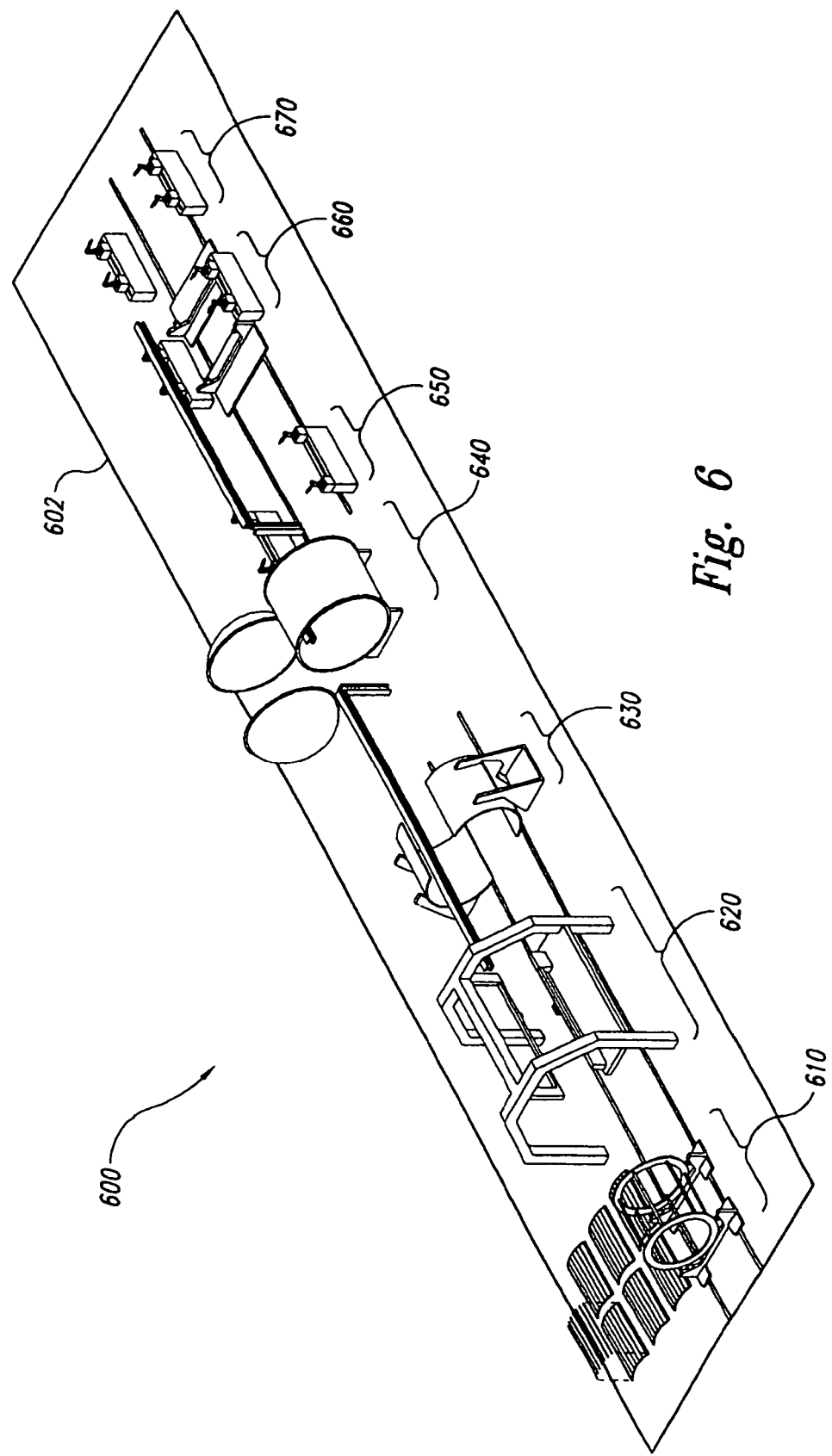
FIG. 6 is a partially schematic isometric view of a barrel section manufacturing system configured in accordance with an embodiment of the invention.

FIG. 6 is a partially schematic isometric view of a barrel section manufacturing system 600 arranged on a factory floor 602 in accordance with an embodiment of the invention. In one aspect of this embodiment described in greater detail below, the barrel section manufacturing system 600 includes a serial arrangement of manufacturing stations configured to manufacture the fuselage barrel sections described above with reference to FIGS. 1-5B. As an overview, in the illustrated embodiment, barrel section fabrication begins at a stiffener loading station 610 before moving to a skin laminating station 620. After skin lamination, the barrel section (not shown) moves to a vacuum station 630 for vacuum-bagging before moving to a curing station 640. From there, the barrel section moves successively to an inspection station 650, a trimming station 660, and an assembly station 670.

The foregoing arrangement of manufacturing stations is but one arrangement that can be used to manufacture the fuselage barrel sections described above. In other embodiments, other manufacturing arrangements and/or other types of manufacturing stations can be used in place of or in addition to one or more of the manufacturing stations illustrated in FIG. 6. For example, in one embodiment, one or more of the manufacturing stations can be positioned in a parallel arrangement rather than the serial-type arrangement illustrated in FIG. 6. In another embodiment, two or more of the manufacturing stations can be combined to form a single station.

Figure 7A:
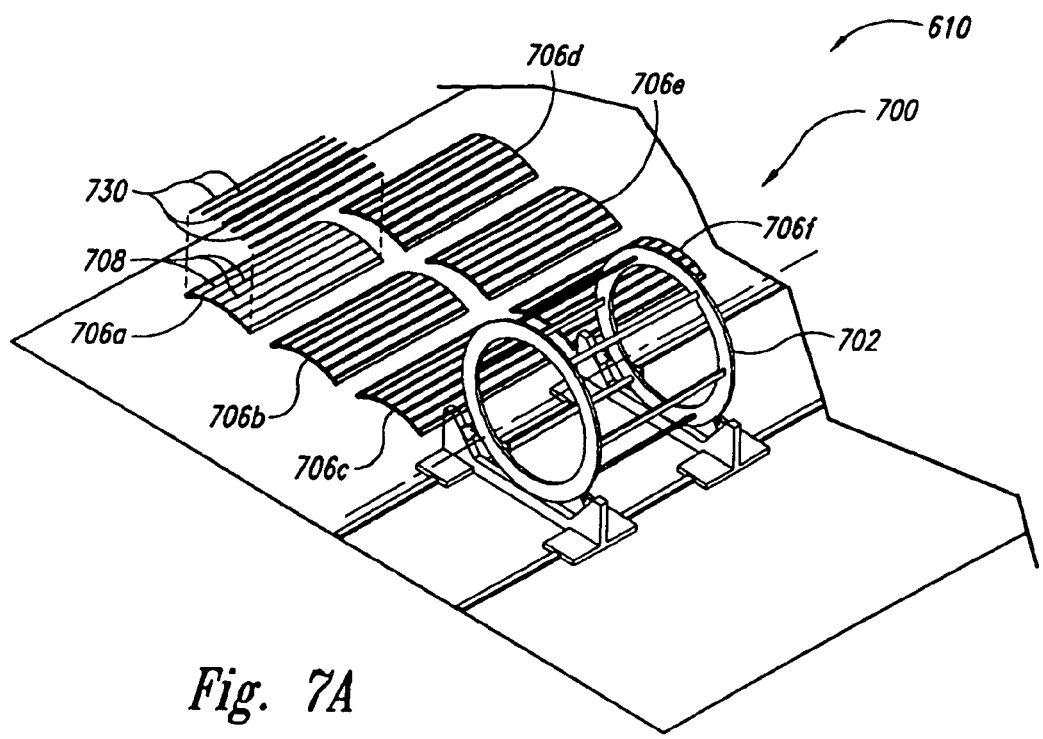
FIGS. 7A and 7B are enlarged, partially schematic isometric views of a barrel section stiffener loading station illustrating two stages of a method for loading stiffeners onto a tool assembly in accordance with an embodiment of the invention.
Figure 7B:
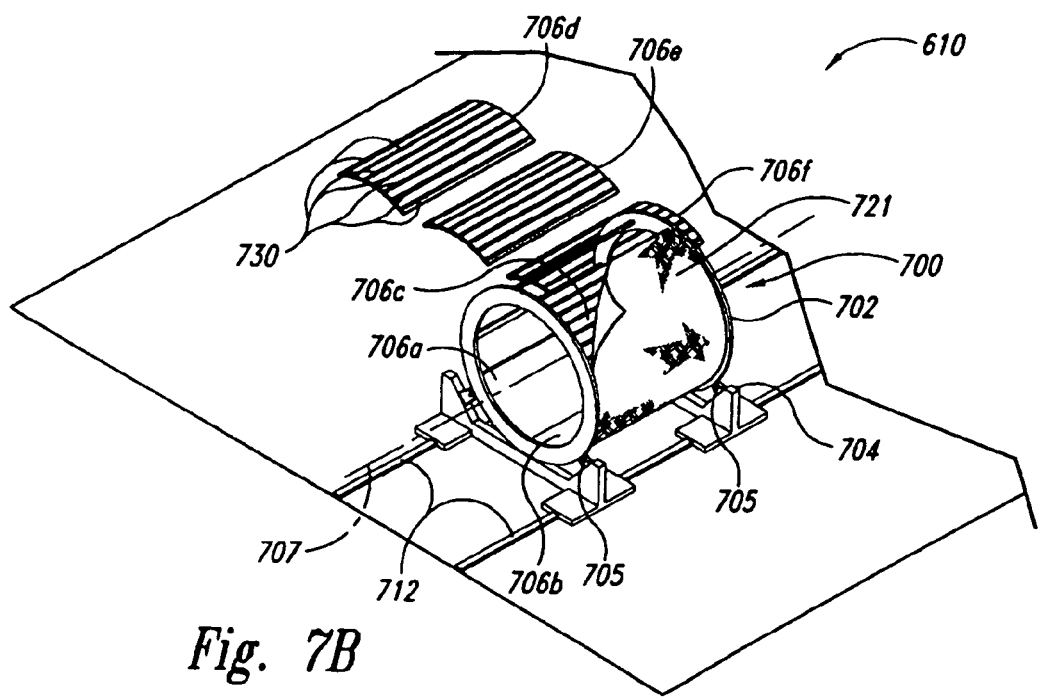

FIGS. 7A and 7B are enlarged, partially schematic isometric views of the stiffener loading station 610 illustrating two stages of a method for loading a plurality of stiffeners 730 onto a barrel section tool assembly 700 in accordance with an embodiment of the invention. Referring first to FIG. 7A, in one aspect of this embodiment, the barrel section tool assembly 700 includes a rotatable tool fixture 702 configured to support a plurality of tool segments 706 (identified individually as tool segments 706a-f) in a cylindrical arrangement. The tool segments 706 can be manufactured from a plurality of suitable materials including steel, invar, aluminum, or composites. Each of the tool segments 706 can include a plurality of stiffener grooves 708 configured to individually receive a corresponding one of the stiffeners 730. In one embodiment, the stiffeners 730 can be hat-section stiffeners (e.g., hat section stiffeners that are at least generally similar in structure and function to the stiffeners 230 described above with reference to FIGS. 2A and 2B). In this embodiment, each of the stiffeners 730 is inverted in the corresponding stiffener groove 708 so that the stiffener flange portions (e.g., the flange portions 231 of FIG. 2A) lie in corresponding recesses formed in the tool segment 706 adjacent to the stiffener grooves 708.

In another aspect of this embodiment, the stiffeners 730 can be least generally uncured when placed in the stiffener grooves 708. In the uncured condition, the stiffeners 730 are relatively flimsy. As a result, suitable tooling (not shown) may be required to at least temporarily hold the stiffeners 730 in position against the tool segments 706 after installation in the stiffener grooves 708. In other embodiments, the stiffeners 730 can be at least partially cured, in which case less or different tooling may be required to hold the stiffeners 730 in position.

Once the tool segments 706 are fully loaded with the stiffeners 730, the tool segments 706 are loaded onto the tool fixture 702, as illustrated in FIG. 7B. In one aspect of this embodiment, the tool fixture 702 is rotatably supported in a tool support structure 704 by a plurality of rollers 705. The rollers 705 enable the tool fixture 702 to rotate about a longitudinal axis 707. To prevent the stiffeners 730 from falling out of the stiffener grooves 708 during rotation, an innermost ply 721 of composite fabric can be wrapped around the tool segments 706 to hold the stiffeners 730 in position. In other embodiments, the innermost ply 721 can be omitted and the stiffeners 730 can be held in position by other means, including local tooling clips or other features. After the innermost ply 721 has been fully installed, the tool support structure 704 transports the tool assembly 700 to the laminating station 620 (FIG. 6) via floor tracks 712.

The tool assembly 700 described above with reference to FIGS. 7A and 7B is but one type of tool assembly that can be used in accordance with the present invention to position stiffeners in a cylindrical arrangement prior to the application of composite skin materials. In other embodiments, other types of tool assemblies can be used. For example, in another embodiment, a similar tool assembly can utilize a central spindle for supporting and rotating the tool fixture 702 in place of the external rollers 705. In a further embodiment, the individual tool segments 706 can be omitted and instead the tool fixture 702 can include a complete cylindrical surface configured to hold the stiffeners 730. This particular approach may offer the advantage of reduced stiffener loading time. However, the other approach of using multiple tool segments may have the advantage of reducing the time required to separate the finished barrel section from the tool assembly after curing.

Figure 8:
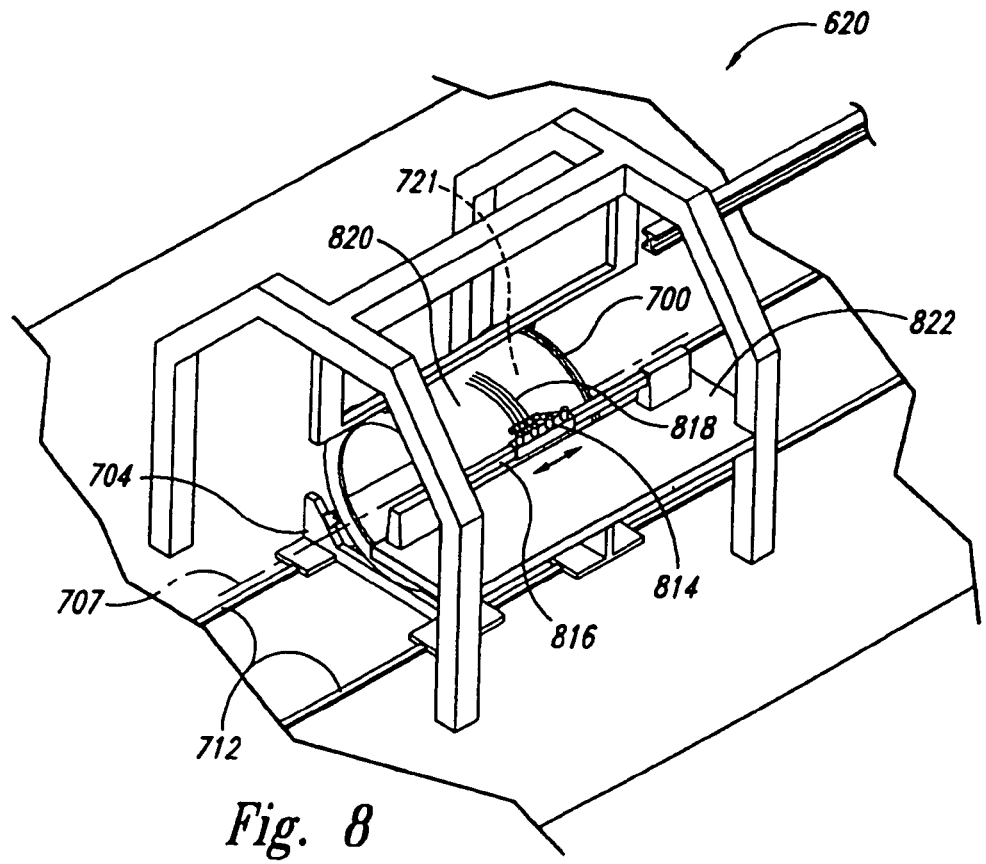
FIG. 8 is an enlarged, partially schematic isometric view of a barrel section laminating station configured in accordance with an embodiment of the invention.

FIG. 8 is an enlarged, partially schematic isometric view of the laminating station 620 configured in accordance with an embodiment of the invention. In one aspect of this embodiment, the laminating station 620 includes a fiber placement machine 814 (shown schematically) movably supported on a track beam 816. The track beam 816 can be part of a work platform 822 positioned adjacent to the tool assembly 700 when the tool assembly 700 is parked in the laminating station 620. While not illustrated in detail in FIG. 8 for purposes of clarity, the fiber placement machine 814 can include one or more payoff heads configured to collimate multiple fiber tows

818. In addition, the fiber placement machine 814 can further include supporting hardware (such as material creels, compaction rollers, etc.) typically used with multi-axis, gantry-mounted placement machines to dispense, clamp, cut, and restart fiber tows and/or other composite materials such as fabric, tapes, individual filaments, and other uni- and multi-directional preimpregnated and non-preimpregnated composite materials and combinations thereof.

In operation, the fiber placement machine 814 moves back and forth along the track beam 816 laminating the collimated fiber tows 818 over the innermost ply 721 as the tool assembly 700 rotates about the longitudinal axis 707. The fiber placement machine 814 can include one or more rollers or other suitable devices (not shown) for holding the innermost ply 721 in place during application of the fiber tows 818 to avoid wrinkling of the innermost ply 721. The fiber placement machine 814 can apply multiple plies in various patterns. For example, in one embodiment, the fiber placement machine 814 can lay down plies on a −45/0/+45 degree bias to provide desired structural properties. In other embodiments, other ply patterns and/or other orientations can be used to provide other structural properties. In addition, hand lay-ups of preimpregnated fabric plies can also be applied over and in between tow plies to provide additional strength around cut-outs and other localized features. In the foregoing manner, the fiber tows 818 together with the innermost ply 721 form a continuous cylindrical skin or laminate 820 extending around the plurality of stiffeners 730 (FIGS. 7A and 7B).

In the embodiment described above, the fiber placement machine 814 applies fiber tows (e.g., carbon fiber tows preimpregnated with a thermoset epoxy resin) to the laminate 820. Such fiber tows can have widths from about 0.06 inch to about 0.50 inch (e.g., about 0.38 inch) after flattening by a compaction roller. In other embodiments, the fiber placement machine can apply other types of tows, e.g., glass fiber tows, graphite fiber tows, and/or tows including other types of aramid fibers and resins.

In another embodiment, the fiber placement machine 814 can apply fiber tape and/or slit fiber tape to the laminate 820 as the tool assembly 700 rotates. The fiber tape can include a plurality of unidirectional fibers, such as carbon fibers. The fibers can be interwoven with another material into a cloth tape, and/or the fibers can be held together by a backing paper that is removed prior to application.

In a further embodiment, the fiber placement machine 814 can apply individual filaments to the laminate 820 in a filament winding process. In yet another embodiment, the fiber placement machine 814 can apply various combinations of the foregoing composite materials, as well as composite fabric sheets, to the laminate 820. The final layer of material applied to the laminate 820 can include a woven wire fabric that provides both structural load carrying capability and lightning protection. In the foregoing embodiments, the tool assembly 700 rotates about the longitudinal axis 707 as the fiber placement machine 814 applies material. In other embodiments, however, the tool assembly 700 can be rotationally fixed, and the fiber placement machine 814 can be moved around the outside of the tool assembly 700 to apply material. After the final layer of material has been applied, the tool support structure 704 transports the tool assembly 700 from the laminating station 620 to the vacuum station 630 (FIG. 6) via the tracks 712.

Figure 9:
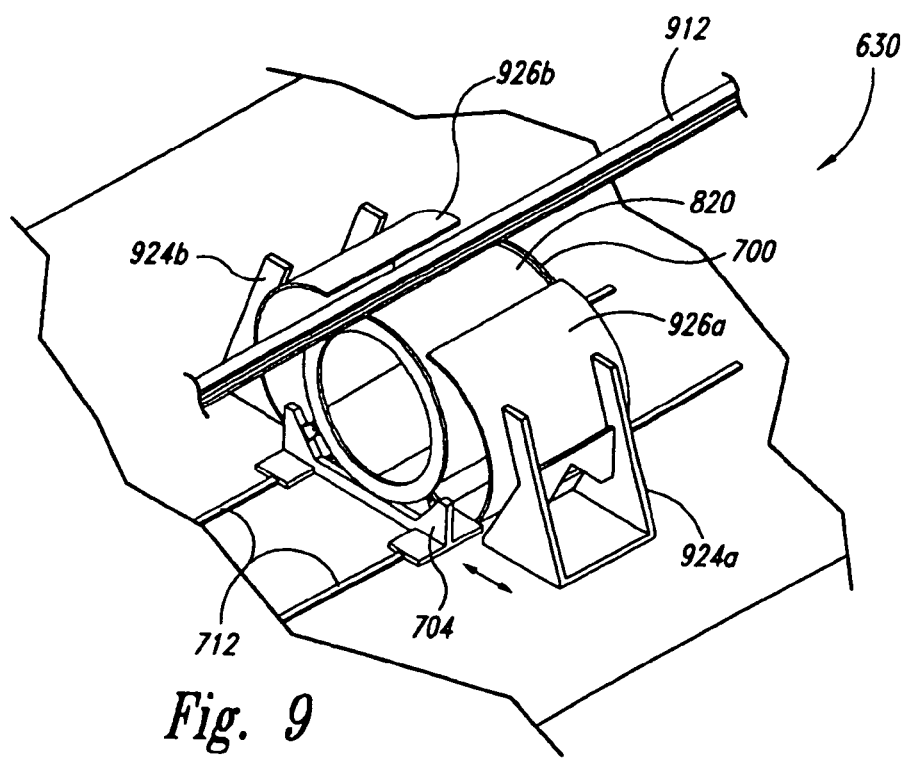
FIG. 9 is an enlarged, partially schematic isometric view of a barrel section vacuum-bagging station configured in accordance with an embodiment of the invention.

FIG. 9 is an enlarged, partially schematic isometric view of the vacuum station 630 configured in accordance with an embodiment of the invention. In one aspect of this embodiment, the vacuum station 630 includes opposing pressure pad supports 924 (identified individually as a first pressure pad support 924a and a second pressure pad support 924b) movably positioned on opposite sides of the tracks 712. Each of the pressure pad supports 924 carries a corresponding pressure pad 926 (identified individually as a first pressure pad 926a and a second pressure pad 926b). In operation, the pressure pad supports 924 move inwardly toward the tool assembly 700 to position the corresponding pressure pads 926 around the laminate 820 in a clam-shell configuration. In one embodiment, the pressure pads 926 can include conformable pressure pads and/or caul sheets configured to apply even pressure to the laminate 820 during subsequent curing to produce a relatively smooth exterior surface. Once the pressure pads 926 have been installed on the laminate 820, the pressure pad supports 924 are retracted and a vacuum bag (not shown) can be installed around the pressure pads 926 and the laminate 820. After the vacuum bag has been evacuated, the tool assembly 700 is lifted off of the tool support structure 704 and moved to the curing station 640 (FIG. 6) via an overhead gantry beam 912. In other embodiments, the vacuum bag can be omitted and the laminate 820 can be cocured without prior evacuation.

Figure 10:
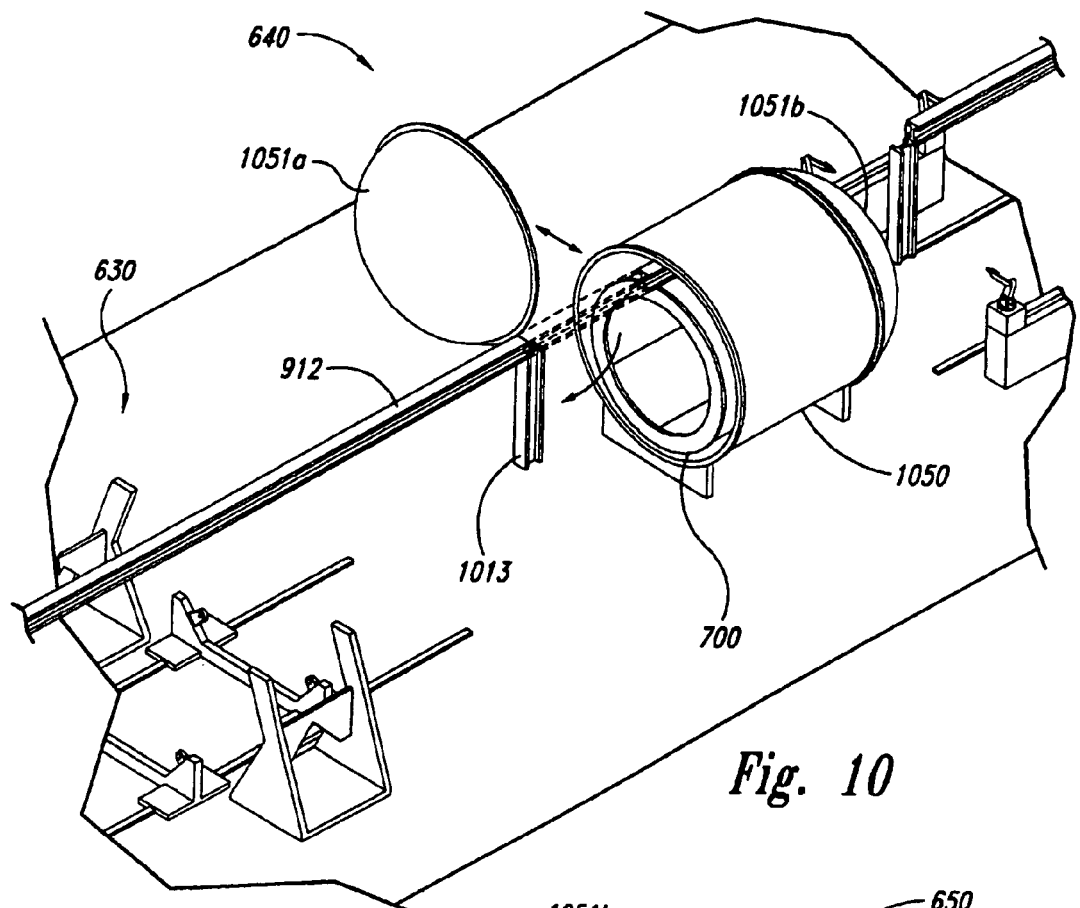
FIG. 10 is an enlarged, partially schematic isometric view of a barrel section curing station configured in accordance with an embodiment of the invention.
Figure 11:
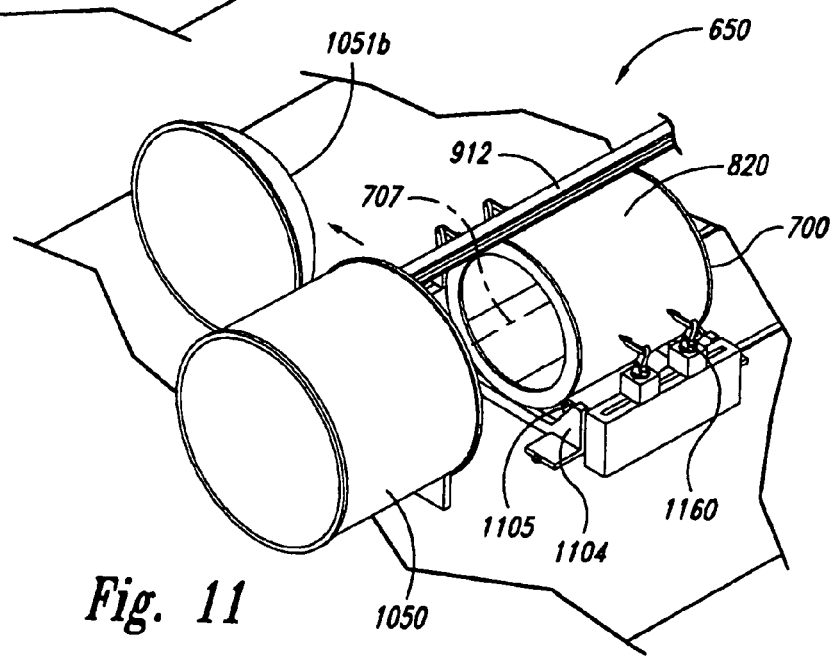
FIG. 11 is an enlarged, partially schematic isometric view of a barrel section inspection station configured in accordance with an embodiment of the invention.

FIG. 10 is an enlarged, partially schematic isometric view of the curing station 640 configured in accordance with an embodiment of the invention. In one aspect of this embodiment, the gantry beam 912 extends from the vacuum station 630 into an autoclave 1050 positioned in the curing station 640. The autoclave 1050 can include a door 1051 at each end (identified individually as a first door 1051a and a second door 1051b). The first door 1051a retracts to allow the tool assembly 700 to move into the autoclave 1050 on the gantry beam 912. Once the tool assembly 700 is positioned fully within the autoclave 1050, a gate section 1013 of the gantry beam 912 moves out of the way to allow the first door 1051a to move back into position. The temperature inside the autoclave 1050 is then elevated to cocure the laminate 820 and the stiffeners 730 (not shown). In one embodiment, the autoclave 1050 can cocure the laminate 820 and the stiffeners 730 using a standard 350° F. cure cycle. In other embodiments, other cure cycles can be used depending on various factors such as material composition, thickness, etc. Once the parts have cooled, the second door 1051b retracts as shown in FIG. 11, and the tool assembly 700 moves out of the autoclave 1050 and on to the inspection station 650 via the gantry beam 912. In other embodiments, the curing station 640 can include other systems for moving the tool assembly 700 in and out of the autoclave 1050. Such systems can include, for example, an autoclave cart, ground-based rails, etc.

FIG. 11 is an enlarged, partially schematic isometric view of the inspection station 650 configured in accordance with an embodiment of the invention. When the tool assembly 700 arrives at the inspection station 650, it is lowered from the gantry beam 912 onto a tool support structure 1104. Next, the laminate 820 is de-bagged and the pressure pads 926 (FIG. 9) are removed. The tool support structure 1104 can be at least generally similar in structure and in function to the tool support structure 704 described above with reference to FIGS. 7A and 7B. Accordingly, the tool support structure 1104 can include a plurality of rollers 1105 configured to rotate the tool assembly 700 about the longitudinal axis 707.

In one aspect of this embodiment, the inspection station 650 includes an inspection machine 1160 movably supported adjacent to the tool support structure 1104. The inspection machine 1160 can be configured to move back and forth along the length of the laminate 820 as the tool assembly 700 rotates to inspect the structural integrity of the laminate 820. In one embodiment, the inspection machine 1160 can include an ultrasonic inspection device for finding voids or disbonds in the laminate 820. In other embodiments, other types of suitable inspection equipment known in the art can be utilized to inspect the laminate 820. Such equipment may include, for example, a pulse-echo inspection apparatus or a thermographic inspection apparatus. Once the laminate 820 has been fully inspected, the tool assembly 700 is again picked up by the gantry beam 912 and moved to the trimming station 660 (FIG. 6).

Figure 12:
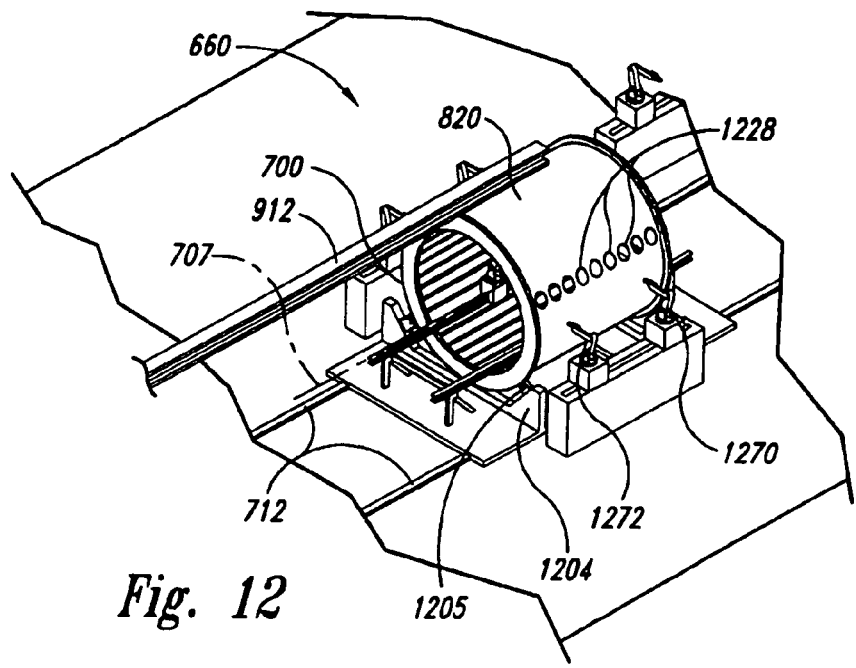
FIG. 12 is an enlarged, partially schematic isometric view of a barrel section trimming station configured in accordance with an embodiment of the invention.

FIG. 12 is an enlarged, partially schematic isometric view of the trimming station 660 configured in accordance with an embodiment of the invention. When the tool assembly 700 arrives at the trimming station 660, it is lowered from the gantry beam 912 onto a tool support structure 1204. The tool support structure 1204 can be at least generally similar in structure and in function to the tool support structures 704 and 1104 described above. Accordingly, the tool support structure 1204 can include a plurality of rollers 1205 configured to rotate the tool assembly 700 about the longitudinal axis 707.

In one aspect of this embodiment, the trimming station 660 includes a CNC (computer numerically controlled) router 1270 and a CNC drill fixture 1272 movably supported adjacent to the tool support structure 1204. Using determinate locator fixtures, the CNC router 1270 can be configured to form a plurality of window cutouts 1228 in the laminate 820. The tool assembly 700 can rotate about the longitudinal axis 707 to facilitate precise location of the window cutouts 1228. Similarly, the CNC drill fixture 1272 can be configured to drill a plurality of fastener and/or assembly holes in the laminate 820 at this time. After these trimming and drilling operations, barrel support rings (not shown) are positioned inside the laminate 820 to maintain the shell profile while the tool segments 706 (FIGS. 7A and 7B) are removed. The tool segments 706 can then be returned to the stiffener loading station 610 (FIG. 6) and prepared for the next fabrication cycle. After the tool segments 706 have been removed, the tool support structure 1204 transports the tool assembly 700 from the trimming station 660 to the final assembly station 670 (FIG. 6) via the floor tracks 712.

Figure 13:
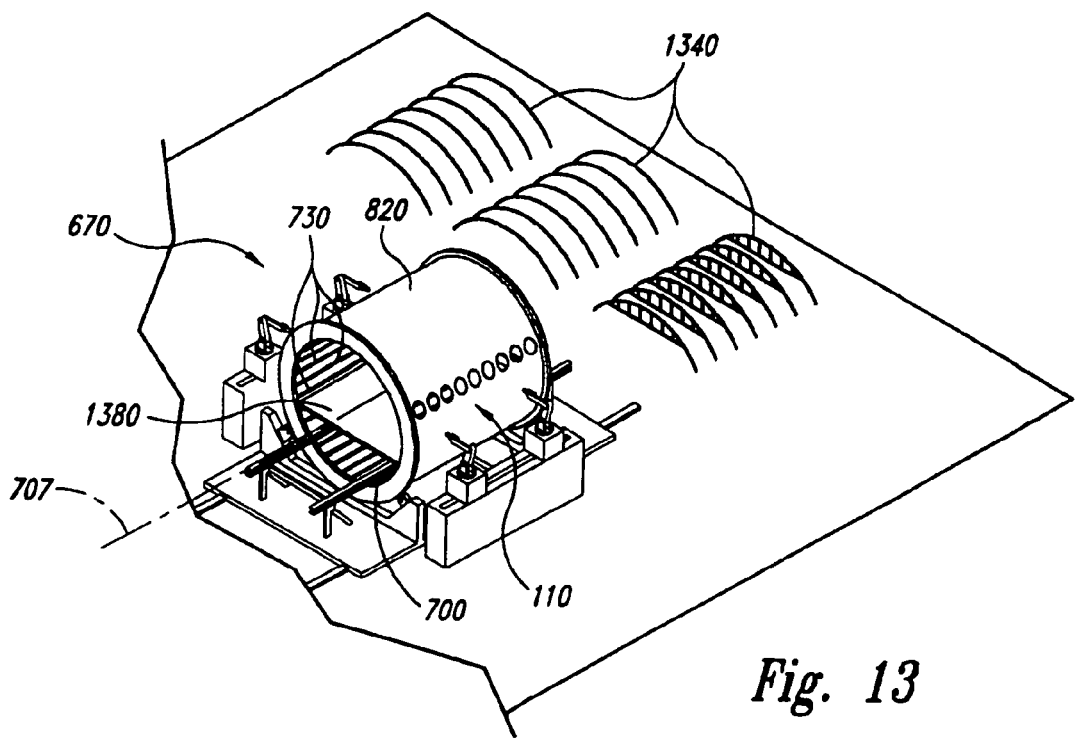
FIG. 13 is an enlarged, partially schematic isometric view of a barrel section assembly station configured in accordance with an embodiment of the invention.

FIG. 13 is an enlarged, partially schematic isometric view of the assembly station 670 configured in accordance with an embodiment of the invention. In one aspect of this embodiment, the final assembly station 670 can include an internal work platform 1380 configured to support an inspection machine (not shown), such as a robotic ultrasonic inspection machine, for inspecting the structural integrity of the laminate 820 from the interior surface. After this inspection, a plurality of frame sections 1340 can be attached to the stiffeners 730 and/or the laminate 820 from inside the tool assembly 700.

In one embodiment, the frame sections 1340 can be at least generally similar in structure and function to the frames 240 and/or the frames 540 described above with reference to FIGS. 2A-B and 5A-B, respectively. In other embodiments, the frame sections 1340 can have other features or, alternatively, they can be omitted. The frame sections 1340 can be located using the determinate assembly holes drilled previously at the trimming station 660 (FIG. 12), and they can be attached using a semi-automated sealing and fastening process. The tool assembly 700 can rotate about the longitudinal axis 707 to facilitate installation of the frame sections 1340. In addition, a preassembled floor module (not shown) can be inserted, located, and attached to frame stub-outs at this time. In a further aspect of this embodiment, the foregoing manufacturing operations complete the basic structural assembly of the fuselage barrel section 110 to a point at which preassembled payloads and interior kits can be installed. After that, the barrel section 110 can be joined to adjacent barrel sections for final assembly of the fuselage 102 illustrated in FIG. 1.

Figure 14A:
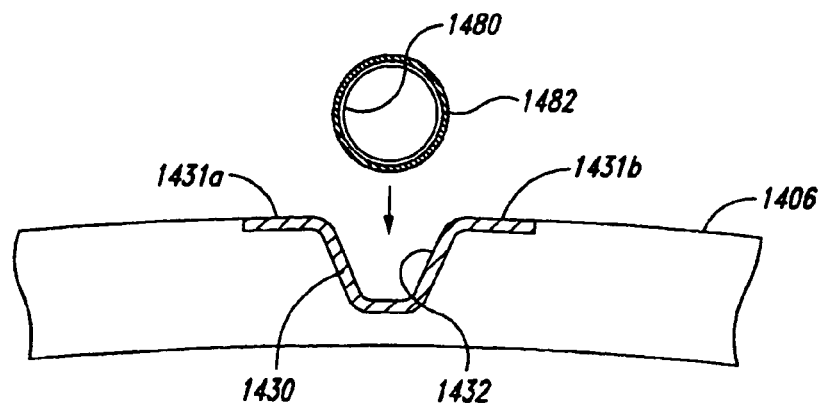
FIGS. 14A-14C are cross-sectional end views illustrating stages of a method for bonding a stiffener to a laminate in accordance with an embodiment of the invention.
Figure 14B:
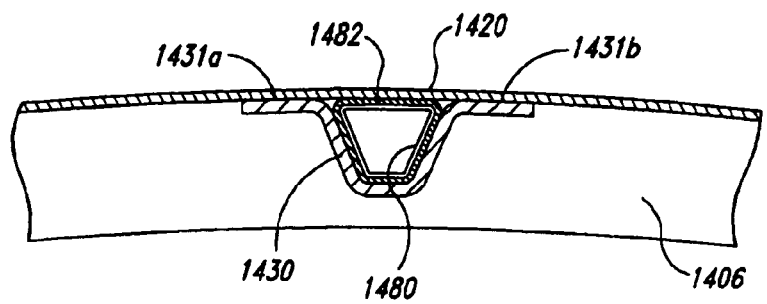
Figure 14C:
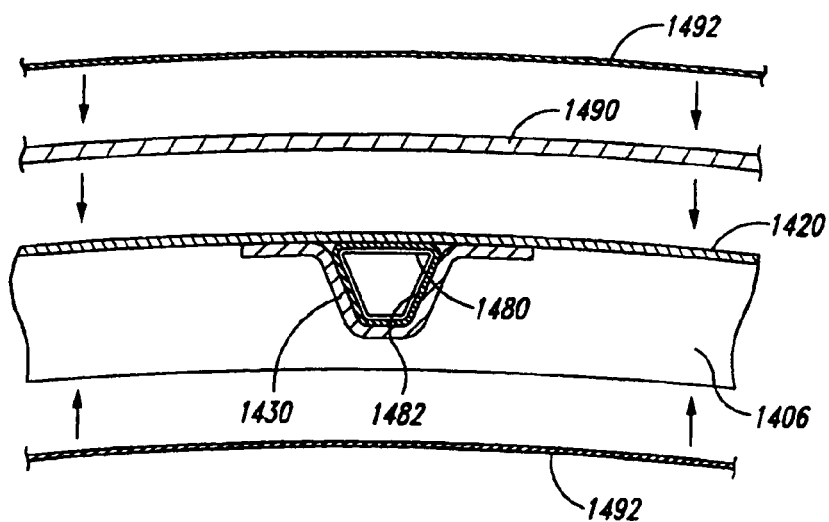

FIGS. 14A-14C are cross-sectional end views illustrating various stages of a method for bonding a stiffener 1430 to a laminate 1420 in accordance with an embodiment of the invention. Referring first to FIG. 14A, the uncured stiffener 1430 can be positioned in a tool 1406. The stiffener 1430 can be a hat section stiffener (e.g., a hat section stiffener that is at least generally similar in structure and function to the stiffeners 230 and 730 discussed above with reference to FIGS. 2A-2B and FIGS. 7A-7B, respectively). In addition, the tool 1406 can be at least generally similar in structure and function to the tool segment 706 described above with reference to FIGS. 7A-7B. After the stiffener 1430 is positioned in the tool 1406, a tubular bladder 1480 supporting a portion of fabric 1482 (or tape, etc.) is positioned inside the stiffener 1430 so that the fabric 1482 contacts an interior surface 1432 of the stiffener 1430 between opposing flange portions 1431a and 1431b.

Referring next to FIG. 14B, once the bladder 1480 and the fabric 1482 are positioned inside the stiffener 1430, composite materials are laminated over the tooling segment 1406 to form a skin 1420 that contacts the flange portions 1431 and the fabric 1482. In one aspect of this embodiment, the skin 1420 can be at least generally similar in structure and function to the skin 220 and the laminate 820 described above with reference to FIGS. 2A-2B and FIG. 8, respectively.

Referring next to FIG. 14C, a compressible pad or caul sheet 1490 is positioned over the skin 1420. Next, a vacuum bag 1492 is positioned around the caul sheet 1490 and the tooling segment 1406. The space between the vacuum bag 1492 and the bladder 1480 is then evacuated to apply an even pressure against the composite parts (i.e., the stiffener 1430, the skin 1420, and the fabric 1482). The composite parts are then cocured at an elevated temperature while under vacuum. After curing, the stiffener/laminate combination is debagged and removed from the tooling segment 1406.

In one embodiment of the method described above with reference to FIGS. 14A-C, the stiffeners 1430 can be manufactured by laying-up one or more plies of material directly into the tool 1406. In another embodiment, the stiffeners can be precured, or at least partially precured, before placement in the tool 1406. When precured stiffeners are used, they can be secondarily bonded to the skin 1420 with an adhesive during the subsequent curing process.

One feature of the forgoing method is that the fabric 1482 serves as an inner doubler bonding the inner surface of the stiffener 1430 to an adjacent portion of the skin 1420 between the opposing flange portions 1431. One advantage of this feature is that the fabric 1482 reduces the peel stresses on the flange portions 1431. As a result, there is less tendency for the stiffener 1430 to disbond from the skin 1420 under high hoop loads that may be encountered in service.

Various components described herein may be manufactured and/or assembled in accordance with the teachings of copending U.S. Provisional Patent Application No. 60/559, 911, entitled "STRUCTURAL PANELS FOR USE IN AIRCRAFT FUSELAGES AND OTHER STRUCTURES," and/or copending U.S. patent application Ser. No. 10/853,075, entitled "STRUCTURAL PANELS FOR USE IN AIRCRAFT FUSELAGES AND OTHER STRUCTURES," both of which were filed on Apr. 6, 2004, and are incorporated herein in their entireties by reference.

Further, the subject matter of copending U.S. patent application Ser. Nos. 10/646,509, entitled "MULTIPLE HEAD AUTOMATED COMPOSITE LAMINATING MACHINE FOR THE FABRICATION OF LARGE BARREL SECTION COMPONENTS," filed Aug. 22, 2003; 10/717,030, entitled "METHOD OF TRANSFERRING LARGE UNCURED COMPOSITE LAMINATES," filed Nov. 18, 2003; 10/646,392, entitled "AUTOMATED COMPOSITE LAY-UP TO AN INTERNAL FUSELAGE MANDREL," filed Aug. 22, 2003; 10/630,594, entitled "COMPOSITE FUSELAGE MACHINE," filed Jul. 28, 2003; 10/646,316, entitled "UNIDIRECTIONAL, MULTI-HEAD FIBER PLACEMENT," filed Aug. 22, 2003; 10/301,949, entitled "PARALLEL CONFIGURATION COMPOSITE MATERIAL FABRICATOR," filed Nov. 22, 2002; 10/799,306, entitled "SYSTEMS AND METHODS ENABLING AUTOMATED RETURN TO AND/OR REPAIR OF DEFECTS WITH A MATERIAL PLACEMENT MACHINE," filed Mar. 12, 2004; 10/726,099, entitled "SYSTEMS AND METHODS FOR DETERMINING DEFECT CHARACTERISTICS OF A COMPOSITE STRUCTURE," filed Dec. 2, 2003; 10/628,691, entitled "SYSTEMS AND METHODS FOR IDENTIFYING FOREIGN OBJECTS AND DEBRIS (FOD) AND DEFECTS DURING FABRICATION OF A COMPOSITE STRUCTURE," filed Jul. 28, 2003; and Ser. No. 10/822,538 entitled "SYSTEMS AND METHODS FOR USING LIGHT TO INDICATE DEFECT LOCATIONS ON A COMPOSITE STRUCTURE, filed Apr. 12, 2004, is incorporated herein in its entirety by reference. In addition, the subject matter of U.S. Pat. No. 6,168,358 is also incorporated herein in its entirety by reference.

From the foregoing, it will be appreciated that specific embodiments of the invention have been described herein for purposes of illustration, but that various modifications may be made without deviating from the spirit and scope of the invention. For example, although the various barrel sections described above have been described in the context of aircraft structures, in other embodiments, such sections can be used in other structural applications, such as space, water, and land vehicle applications. Accordingly, the invention is not limited, except as by the appended claims.

We claim:

1. A section of an aircraft fuselage, the section comprising:
   a sheet of composite fabric forming at least a first portion of a skin extending continuously for 360 degrees about a longitudinal axis of the section, the sheet of composite fabric having a preformed first width;
   a plurality of fiber tows individually applied over the sheet of composite fabric, wherein each of the individual fiber tows has a second width that is narrower than the first width, and wherein the plurality of fiber tows form at least a second portion of the skin extending continuously for 360 degrees about the longitudinal axis of the section;
   a first longitudinal stiffener having a first flange portion bonded to an interior surface of the sheet of composite fabric during a cocuring process, and a first raised portion projecting inwardly and away from the interior surface of the sheet of composite fabric;
   at least a second longitudinal stiffener spaced apart from the first stiffener, the second stiffener having a second flange portion bonded to the interior surface of the sheet of composite fabric during the cocuring process, and a second raised portion projecting inwardly and away from the interior surface of the sheet of composite fabric; and
   a circumferential frame section extending across the first and second stiffeners, wherein the circumferential frame section is mechanically fastened to the skin and the first and second stiffeners after the cocuring process.

2. The section of claim 1 wherein each of the fiber tows includes a bundle of fibers preimpregnated with resin.

3. The section of claim 1 wherein each of the fiber tows includes a bundle of carbon fibers preimpregnated with epoxy resin, and wherein each of the collimated fiber tows has a compressed width from about 0.06 inch to about 0.50 inch.

4. The section of claim 1, further comprising a plurality of mechanical fasteners extending through a portion of the circumferential frame section and the skin.

5. The section of claim 1, further comprising a plurality of mechanical fasteners extending through a portion of the circumferential frame section and the first and second stiffeners.

6. The section of claim 1 wherein the circumferential frame section includes at least first and second openings, and wherein the first raised portion of the first stiffener extends through the first opening and the second raised portion of the second stiffener extends through the second opening.

7. The section of claim 1 wherein the plurality of fiber tows include a plurality of collimated fiber tows.

8. The section of claim 1 wherein the plurality of fiber tows include a plurality of compacted fiber tows.

9. A section of an aircraft fuselage, the section comprising:
   a skin having a plurality of fiber tows forming a continuous surface extending 360 degrees about an axis;
   a first stiffener having a first flange portion bonded to an interior surface of the skin and a first raised portion projecting inwardly and away from the interior surface of the skin;
   at least a second stiffener spaced apart from the first stiffener, the second stiffener having a second flange portion bonded to the interior surface of the skin and a second raised portion projecting inwardly and away from the interior surface of the skin, and
   a frame section having a base portion mated to the first flange portion of the first stiffener and the second flange portion of the second stiffener without being mated to the skin between the first raised portion of the first stiffener and the second raised portion of the second stiffener.

10. A section of an aircraft fuselage, the section comprising:
    a skin having a plurality of fiber tows forming a continuous surface extending 360 degrees about an axis;
    a first stiffener having a first flange portion bonded to an interior surface of the skin and a first raised portion projecting inwardly and away from the interior surface of the skin, wherein the first flange portion has a first outer edge;
    at least a second stiffener spaced apart from the first stiffener, the second stiffener having a second flange portion bonded to the interior surface of the skin and a second raised portion projecting inwardly and away from the interior surface of the skin, wherein the second flange portion has a second outer edge facing the first outer edge of the first flange portion; and
    a frame section having a base portion, wherein at least one of the first flange portion of the first stiffener and the second flange portion of the second stiffener extends toward the other of the first flange portion and the second flange portion to form an at least approximately continuous support surface extending between the first raised portion of the first stiffener and the second raised portion of the second stiffener, and wherein the base portion of the frame section mates to the at least approximately continuous support surface.

11. A section of an aircraft fuselage, the section comprising:

a sheet of composite fabric forming at least a first portion of a skin extending continuously for 360 degrees about a longitudinal axis of the section, the sheet of composite fabric having a preformed first width;

a plurality of fiber tapes individually applied over the sheet of composite fabric, wherein each of the individual fiber tapes has a second width that is narrower than the first width, and wherein the plurality of fiber tapes forms at least a second portion of the skin extending continuously for 360 degrees about the longitudinal axis of the section;

a first longitudinal stiffener having a first flange portion bonded to an interior surface of the sheet of composite fabric during a cocuring process, and a first raised portion projecting inwardly and away from the interior surface of the sheet of composite fabric;

at least a second longitudinal stiffener spaced apart from the first stiffener, the second stiffener having a second flange portion bonded to the interior surface of the sheet of composite fabric during the cocuring process, and a second raised portion projecting inwardly and away from the interior surface of the sheet of composite fabric; and a circumferential frame section extending across the first and second stiffeners, wherein the circumferential frame section is mechanically fastened to the skin and the first and second stiffeners after the cocuring process.

12. The section of claim 11 wherein each of the fiber tapes includes a plurality of unidirectional fiber strands preimpregnated with resin.

13. The section of claim 11 wherein each of the fiber tapes includes a plurality of unidirectional fiber strands interwoven into a fabric tape.

14. The section of claim 11 wherein each of the fiber tapes includes a plurality of unidirectional carbon fiber strands.

15. The section of claim 11, further comprising a plurality of mechanical fasteners extending through the circumferential frame section and the skin.

16. The section of claim 11, further comprising a plurality of mechanical fasteners extending through a portion of the circumferential frame section and the first and second stiffeners.

17. The section of claim 11 wherein the circumferential frame section includes at least first and second openings, and wherein the first raised portion of the first stiffener extends through the first opening and the second raised portion of the second stiffener extends through the second opening.

18. A section of an aircraft fuselage, the section comprising:

a skin having a plurality of fiber tapes forming a continuous surface extending 360 degrees about an axis;

a first stiffener having a first flange portion bonded to an interior surface of the skin and a first raised portion projecting inwardly and away from the interior surface of the skin, wherein the first flange portion has a first edge;

at least a second stiffener spaced apart from the first stiffener, the second stiffener having a second flange portion bonded to the interior surface of the skin and a second raised portion projecting inwardly and away from the interior surface of the skin, wherein the second flange portion has a second edge opposite the first edge of the first flange portion; and a frame section having a base portion, wherein at least one of the first flange portion of the first stiffener and the second flange portion of the second stiffener extends toward the other of the first flange portion and the second flange portion to form an at least approximately continuous support surface extending between the first raised portion of the first stiffener and the second raised portion of the second stiffener, and wherein the base portion of the frame section mates to the at least approximately continuous support surface.

19. A section of an aircraft fuselage, the section comprising:

a skin having a plurality of unidirectional fibers forming a continuous surface extending 360 degrees about an axis;

a first stiffener having a first flange portion mated to an interior surface of the skin and a first raised portion projecting inwardly and away from the skin, wherein the first flange portion has a first edge; and at least a second stiffener spaced apart from the first stiffener, the second stiffener having a second flange portion mated to the interior surface of the skin and a second raised portion projecting inwardly and away from the skin, wherein the second flange portion has a second edge positioned adjacent to the first edge, and wherein at least one of the first flange portion of the first stiffener and the second flange portion of the second stiffener extends toward the other of the first flange portion and the second flange portion to form an at least approximately continuous support surface extending between the first raised portion of the first stiffener and the second raised portion of the second stiffener.

20. The section of claim 19, further comprising a frame section in contact with the support surface between the first raised portion of the first stiffener and the second raised portion of the second stiffener.

21. The section of claim 19, further comprising a frame section having at least first and second openings, wherein the first raised portion of the first stiffener extends through the first opening and the second raised portion of the second stiffener extends through the second opening.

22. A section of an aircraft fuselage, the section comprising:

an inner fabric ply forming a continuous inner surface extending 360 degrees about an axis, the inner fabric ply having a preformed first width;

a plurality of unidirectional fiber strands individually laminated to an outer portion of the inner fabric ply, wherein each of the individual unidirectional fiber strands have a second width that is narrower than the first width;

an outer fabric ply laminated to an outer portion of the plurality of unidirectional fibers, the outer fabric ply forming a continuous outer surface extending 360 degrees about the axis;

a first stiffener having a first flange portion bonded to the inner surface of the inner fabric ply and a first raised portion projecting inwardly and away from the inner surface;

at least a second stiffener spaced apart from the first stiffener, the second stiffener having a second flange portion bonded to the inner surface of the inner fabric ply and a second raised portion projecting inwardly and away from the inner surface; and a frame section attached at least proximate to the inner surface of the inner fabric ply, wherein the frame section includes at least first and second openings, and wherein the first raised portion of the first stiffener extends through the first opening and the second raised portion of the second stiffener extends through the second opening.

23. The section of claim 22 wherein at least one of the first flange portion of the first stiffener and the second flange portion of the second stiffener extends toward the other of the first flange portion and the second flange portion to form an at least approximately continuous support surface extending between the first raised portion of the first stiffener and the second raised portion of the second stiffener, and wherein the frame section further includes a base section that is mated to the at least approximately continuous support surface.

24. An aircraft structure comprising:
a section of a passenger cabin, wherein the passenger cabin is configured to hold at least about 50 passenger seats, and wherein the section includes:
a skin extending continuously for 360 degrees about a longitudinal axis of the section, wherein the skin includes:
an inner fabric ply forming at least a portion of an inner surface of the skin, the inner fabric ply having a preformed first width;
a plurality of unidirectional fiber strands individually laminated to an outer portion of the inner fabric ply, wherein each of the individual unidirectional fiber strands has a second width that is narrower than the first width; and
an outer fabric ply laminated to an outer portion of the plurality of unidirectional fiber strands, the outer fabric ply forming at least a portion of an outer surface of the skin;
a first longitudinal stiffener bonded to the inner surface of the inner fabric ply during a cocuring process in which the skin and at least the first stiffener are cocured;
at least a second longitudinal stiffener spaced apart from the first stiffener and bonded to the inner surface of the inner fabric ply during the cocuring process; and
a circumferential frame section extending across the first and second stiffeners, wherein the circumferential frame section is mechanically fastened to the skin and the first and second stiffeners after the cocuring process.

25. The aircraft structure of claim 24 where the first stiffener has a first flange portion bonded to the inner surface of the skin and a first raised portion projecting inwardly and away from the inner surface of the skin, wherein the second stiffener has a second flange portion bonded to the inner surface of the skin and a second raised portion projecting inwardly and away from the inner surface of the skin, and wherein the circumferential frame section further comprises a base portion mated to the first flange portion of the first stiffener and the second flange portion of the second stiffener without being mated to the skin between the first raised portion of the first stiffener and the second raised portion of the second stiffener.

26. The aircraft structure of claim 24, further comprising at least 50 passenger seats, wherein the at least 50 passenger seats are positioned in the section of the passenger cabin.

27. The structure of claim 24 wherein the outer fabric ply includes a plurality of metallic wires for lightning strike protection.

28. The structure of claim 24 wherein the plurality of unidirectional fiber strands include a plurality of individual fiber tows.

29. An aircraft fuselage comprising:
a fuselage barrel section having a skin extending continuously for 360 degrees about a longitudinal axis of the barrel section, wherein the skin includes:
a plurality of composite fabric sheets extending continuously for 360 degrees about a longitudinal axis of the section, wherein each of the individual composite fabric sheets has a preformed first width; and
a plurality of fiber tows individually applied over the plurality of composite fabric sheets and extending continuously for at least 360 degrees about the longitudinal axis of the barrel section, wherein each of the individual fiber tows has a second width that is narrower than the first width;
a first longitudinal stiffener extending parallel to the longitudinal axis of the barrel section, wherein the first stiffener is bonded to an interior surface of the composite fabric sheets during a cocuring process in which the skin and at least the first stiffener are cocured; and
at least a second longitudinal stiffener extending parallel to the longitudinal axis of the barrel section and spaced apart from the first stiffener, wherein the second stiffener is bonded to the interior surface of the composite fabric sheets during the cocuring process.

30. The aircraft fuselage of claim 29 wherein the fuselage barrel section further includes:
an inner fabric ply extending continuously for 360 degrees about the longitudinal axis of the barrel section, wherein the plurality of fiber tows are laminated to an outer portion of the inner fabric ply; and
an outer fabric ply extending continuously for 360 degrees about the longitudinal axis of the barrel section, wherein the outer fabric ply is laminated to an outer portion of the plurality of fiber tows.

31. The aircraft fuselage of claim 29 wherein the fuselage barrel section is a first barrel section, wherein the skin is a first skin, wherein the longitudinal axis is a first longitudinal axis, and wherein the aircraft fuselage further comprises:
a second barrel section having a second skin extending continuously for 360 degrees about a second longitudinal axis of the second barrel section, wherein the second skin includes a plurality of fiber tows extending continuously for at least 360 degrees about the second longitudinal axis of the second barrel section; and
a circumferential joint attaching the first barrel section to the second barrel section so that the first longitudinal axis of the first barrel section is at least approximately aligned with the second longitudinal axis of the second barrel section.

32. The aircraft fuselage of claim 31, further comprising at least 50 passenger seats, wherein at least a portion of the 50 passenger seats are positioned in the first and second barrel sections.

33. The aircraft fuselage of claim 29 wherein the fuselage barrel section is a first barrel section, and wherein the aircraft fuselage further comprises:
a plurality of additional barrel sections, wherein the first barrel section and each of the additional barrel sections is at least substantially similar in construction;
a plurality of circumferential joints, wherein each of the circumferential joints joins one of the first barrel section and the additional barrel sections to another of the first barrel section and the additional barrel sections; and
at least 150 passenger seats, wherein the at least 150 passenger seats are positioned in the first barrel section and the additional barrel sections of the aircraft fuselage.

34. An aircraft fuselage comprising:
a one-piece barrel section having a cross-sectional dimension of at least 12 feet, wherein the barrel section includes:
a skin extending continuously for 360 degrees about a longitudinal axis of the barrel section, wherein the skin includes an inner fabric ply forming at least a portion of an inner surface of the skin, the inner fabric ply having a preformed first width, wherein the skin further includes a plurality of unidirectional fiber strands laminated to an outer portion of the inner fabric ply, the individual unidirectional fiber strands having a second width that is narrower than the first width, and wherein the skin additionally includes an outer fabric ply laminated to an outer portion of the plurality of unidirectional fiber strands, the outer fabric ply forming at least a portion of an outer surface of the skin;

a first stiffener bonded to the inner surface of the skin during a cocuring process in which the skin and at least the first stiffener are cocured; and at least a second stiffener spaced apart from the first stiffener and bonded to the inner surface of the skin during the cocuring process.

35. The aircraft fuselage of claim 34 wherein the skin extends continuously for 360 degrees about the longitudinal axis of the barrel section in the absence of a longitudinally oriented joint attaching one portion of the skin to an adjacent portion of the skin.

36. The aircraft fuselage of claim 34, further comprising at least about 50 passenger seats, wherein at least a portion of the passenger seats are positioned in the barrel section.

* * * * *